US007952897B2

(12) United States Patent
Nocentini et al.

(10) Patent No.: US 7,952,897 B2
(45) Date of Patent: May 31, 2011

(54) SYSTEM FOR PRODUCING ELECTRIC POWER FROM RENEWABLE SOURCES AND A CONTROL METHOD THEREOF

(75) Inventors: Danio Nocentini, Florence (IT); Sauro Macerini, Arezzo (IT); Nicola Femia, Salerno (IT); Massimo Vitelli, Caserta (IT); Giovanni Spagnuolo, Salerno (IT); Giovanni Petrone, Salerno (IT); Filippo De Rosa, Salerno (IT); Antonio Sirianni, Catanzaro (IT)

(73) Assignee: Power-One Italy S.p.A., Arezzo (IT)

( * ) Notice: Subject to any disclaimer, the term of this patent is extended or adjusted under 35 U.S.C. 154(b) by 104 days.

(21) Appl. No.: 12/158,723

(22) PCT Filed: Dec. 22, 2005

(86) PCT No.: PCT/IT2005/000757
§ 371 (c)(1),
(2), (4) Date: Dec. 3, 2008

(87) PCT Pub. No.: WO2007/072517
PCT Pub. Date: Jun. 28, 2007

(65) Prior Publication Data
US 2009/0091956 A1 Apr. 9, 2009

(51) Int. Cl.
H02M 1/12 (2006.01)
(52) U.S. Cl. .................................. 363/41; 323/906
(58) Field of Classification Search ............... 363/41; 323/906
See application file for complete search history.

(56) References Cited

U.S. PATENT DOCUMENTS

| | | | | |
|---|---|---|---|---|
| 4,494,180 A | * | 1/1985 | Streater et al. | 363/37 |
| 6,914,418 B2 | * | 7/2005 | Sung | 320/140 |
| 2008/0278983 A1 | * | 11/2008 | Park | 363/95 |

OTHER PUBLICATIONS

Chicco, G., et al: "Experimental Evaluation of the Performance of Grid-Connected Photovoltaic Systems" Electrotechnical Conference 2004. Melecon 2004. Proceedings of the 12th IEEE Mediterranean Dubrovnik, Croatia May 12-15, 2004, Piscataway, NJ, USA, IEEE, US, pp. 1011-1016, XP010734901 ISBN: 0-7803-8271-4.

(Continued)

Primary Examiner — Shawn Riley
(74) Attorney, Agent, or Firm — Waddey & Patterson; Mark J. Patterson; Gary L. Montle

(57) ABSTRACT

Described herein is a system for generating electric power, comprising: an electric-power source (1) having a preferential point of operation; a double-stage inverter (3A, 3B), which transfers the energy from said source to an external a.c.-voltage electrical network (9); a block (5) for identification of the preferential point of operation, which supplies a reference signal according to the conditions of operation of the electric-power source and to the preferential point of operation of said source; a corrector block (10), provided for setting the parameter for control of the boost converter (3A) of the double-stage inverter (3A, 3B) as a function of the reference signal and of a signal of actual operation of said electric-power source, and for maintaining the source in the proximity of the preferential point of operation.

14 Claims, 18 Drawing Sheets

OTHER PUBLICATIONS

Alonso, O., et al: "Cascaded h-Bridge Multilevel Converter for Grid Connected Photovoltaic Generators with Independent Maximum Power Point Tracking of Each Solar Array" PESC '03. 2003 IEEE 34th Annual Power Electronics Specialists Conference Proceedings. Acapulco, Mexico, Jun. 15-19, 2003, Annual Power Electronics Specialists Conference, NY, NY,: IEEE, US, vol. 4 of 4 Conf. 34, pp. 731-735, XP010648900 ISBN: 0-7803-7754-0.

Patcharaprakiti, N., et al: "Maximum power point tracking using adaptive fuzzy logic control for grid-connected photovoltaic system" Renewable Energy, Pergamon Press, Oxford, GB, vol. 30, No. 11, Sep. 2005, pp. 1771-1788, XP004883530 ISSN: 0960-1481.

Kim, I-S, et al: "Variable-structure observer for solar-array current estimation in a photovoltaic power-generation system" IEEE Proceedings: Electric Power applications, Institution of Electrical Engineers, GB, vol. 152, No. 4, May 25, 2005, pp. 953-959, XP006024139 ISSN; 1350-2352.

* cited by examiner

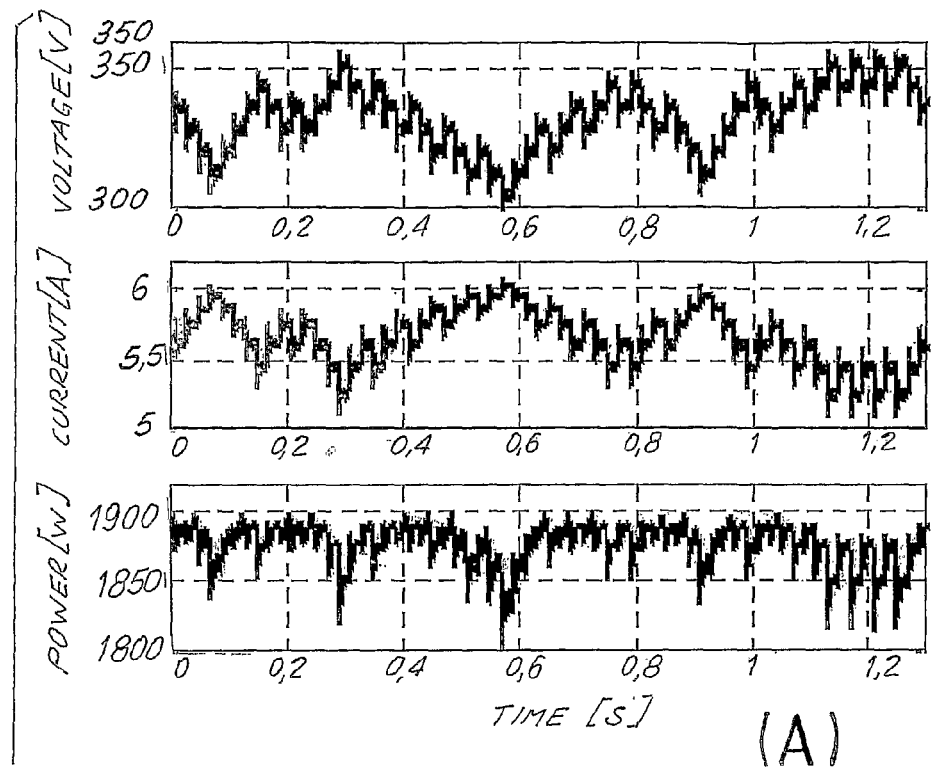
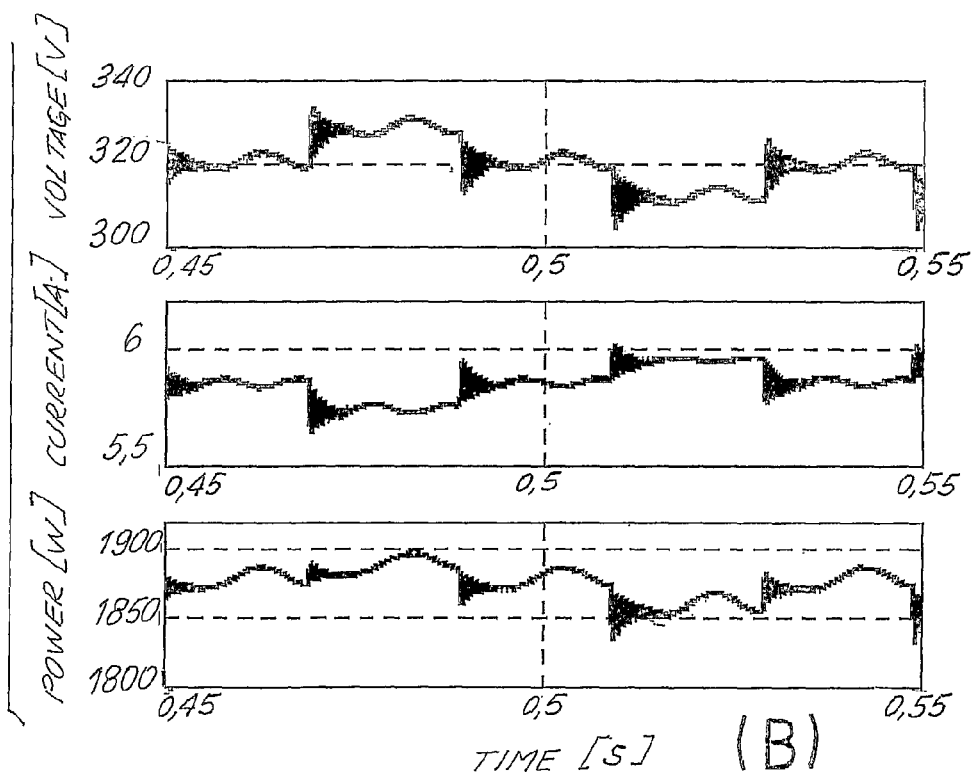
Fig. 5

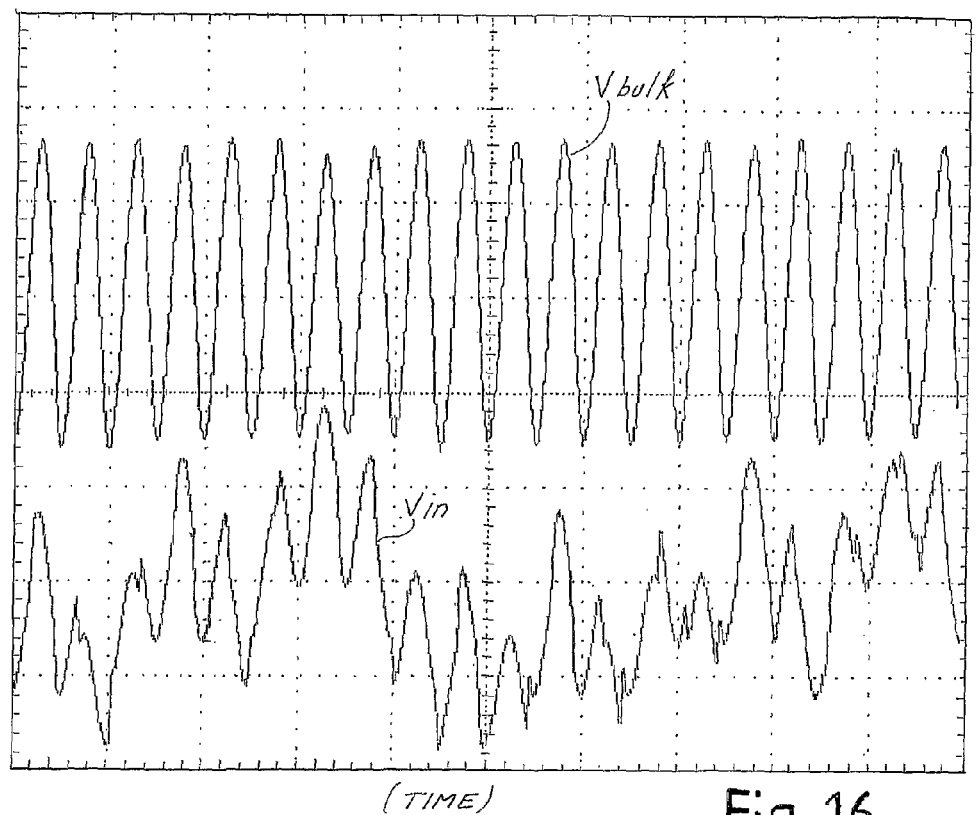
(TIME) Fig. 16
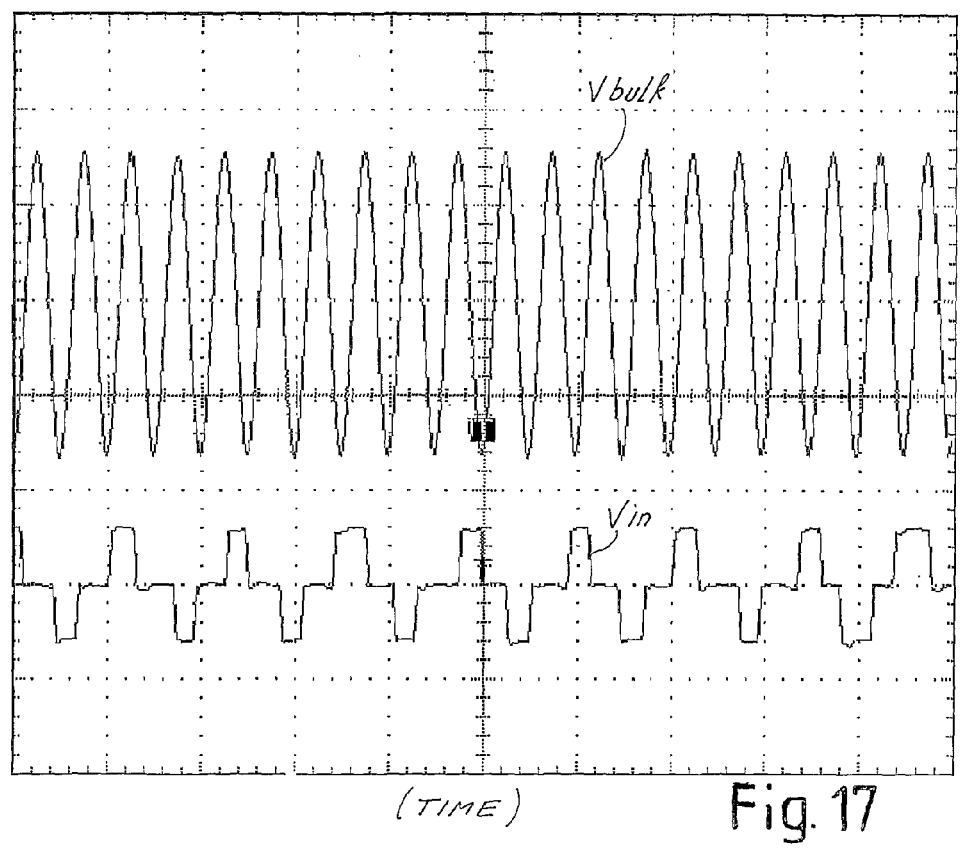
(TIME) Fig. 17

SYSTEM FOR PRODUCING ELECTRIC POWER FROM RENEWABLE SOURCES AND A CONTROL METHOD THEREOF

TECHNICAL FIELD

The present invention relates to improvements to systems for producing electric power from renewable sources, such as for example (but not exclusively) photovoltaic panels. In particular, the present invention relates to improvements to methods and devices for the control of systems for producing electric power, which have the function of maximizing the extraction of power.

More in general, the present invention relates to the control of sources of electric power that have a preferential point of operation, which is correlated to a parameter that can vary as a function of a non-controllable event. In the case of photovoltaic panels, said preferential point of operation is typically represented by the point along the current-voltage curve, which supplies the maximum power that can be supplied by the field of photovoltaic panels. This preferential point of operation varies as the insolation, i.e. the solar power incident on the field of photovoltaic panels, varies, preferential points of operation (at maximum power) that correspond to different voltages across the field of photovoltaic panels corresponding to variable conditions of insolation.

STATE OF THE ART

In order to tackle the problem represented by environmental pollution and the ever-increasing requirement for electric power also for domestic uses, installation of distributed electric-power generator sets for powering loads of modest dimensions is currently encouraged, for example in the field of residential dwellings, and commercial or industrial premises. These generator sets use alternative energy sources, and in particular renewable sources, such as, in particular, solar energy using photovoltaic cells, forming panels or so-called photovoltaic fields, or else wind power using aerogenerators.

Typically, an alternative source of this kind, which generates a d.c. current, is associated to a power-conditioning unit comprising an inverter. The inverter is connected in parallel to the electric-power-supply network or grid, so that a generic local load can be supplied by the electrical network or by the inverter alternatively, or by both. When the power supplied by the alternative source is insufficient to supply the load, it is supplied either totally or in part by power drawn from the network. Instead, when the load absorbs less power than that available from the alternative source, or else when the load is not supplied, the power generated by the alternative source is introduced into the electrical network.

In certain cases, the alternative source is connected only to a load and to an accumulator, but not to the electric-power-supply network.

Photovoltaic panels can constitute the alternative energy source. These can be connected to the network and to the load via converters that must perform substantially two functions. In the first place, they must cause, as the operating conditions vary, the maximum power possible always to be extracted from the renewable source. In the second place, they must cause the current at output from the converter to be in phase with the network or grid voltage. The first of the two functions is defined also as maximum-power-point tracking (MPPT).

In fact, for example in the case of photovoltaic panels, the power that can be extracted from the field of photovoltaic panels depends upon the conditions of irradiation or insolation; that is, it depends upon the amount of solar energy incident on the cells and is a function of the voltage applied across the field of photovoltaic panels itself and hence at the converter input terminals. FIG. 1 shows a diagram of the curve of the voltage-current characteristic of a typical field of photovoltaic panels, as well as the curve of the power that can be extracted from the field of photovoltaic panels for various conditions of solar irradiation as the voltage across the field of photovoltaic panels itself varies. Designated by P1, P2, ..., Pn are the curves of power versus voltage V across the field of photovoltaic panels or photovoltaic field for different conditions of irradiation Irr. The curves P1, P2, ..., Pn regard a decreasing irradiation Irr. Designated by I is the voltage-current characteristic of the field of photovoltaic panels.

From FIG. 1 it may be noted that each curve Pi has a maximum that is characterized by voltages V that are progressively lower as the irradiation decreases. In other words, as the solar irradiation decreases—as may be understood intuitively—the electric power that can be extracted from the field of photovoltaic panels decreases, and moreover the maximum of the power is obtained by getting the field of photovoltaic panels to work at voltages that vary with the temperature and the irradiation. Designated by M is the curve on which the maxima of the curves P1, P2, ... Pi, ... Pn are found.

The curve Pi on which the system, constituted by the field of photovoltaic panels and by the converter connected to the load and/or to the electrical network, is operating depends upon the conditions of irradiation, which can vary in an altogether random way. The function of maximum power-point tracking (MPPT) at which the converter must operate hence serves to maintain the voltage across the field of photovoltaic panels at a value as close as possible to the one at which there is the maximum of the curve Pi on which the field of photovoltaic panels is instantaneously operating. In FIG. 1 said values are designated by V1, V2, ..., Vn.

Examples of controls of inverters for photovoltaic panels which have an MPPT function are described in: U.S. Pat. Nos. 4,649,334; 5,869,956; 5,747,967; 5,327,071; 6,590,793; 6,844,739; 5,923,100; 6,433,522; 6,882,131; 6,914,418; 6,919,714; 4,404,472; US-A-2005/0116671; U.S. Pat. No. 4,494,180; US-A-2005/0110454; and US-A-2003/0066555.

In some cases, a converter for photovoltaic panels has a double-stage structure, the schematic block diagram of which is illustrated in FIG. 2. Designated by 1 is the field of photovoltaic panels and by 3 the converter as a whole. This comprises a stage 3A, also referred to as input or boosting stage, which represents the interface with the source 1 constituted by the field of photovoltaic panels. The converter 3 further comprises an output stage 3B, which constitutes the interface to the network. The stage 3A is constituted basically by a DC/DC converter, which sees to boosting the output voltage of the field of photovoltaic panels to the programmed input bulk voltage (Vbulk) of the second stage 3B, which is constituted by a DC/AC inverter. Designated as a whole by 5 is a control block that executes an MPPT function, and designated by 7 is a block for controlling the DC/AC inverter, which maintains the current at output from the inverter in phase with the network voltage, the electrical network being schematically represented by a voltage source 9. In addition to the output-current-phase control loop, the control block 7 comprises a loop for controlling the bulk voltage (Vbulk), i.e. the voltage at input to the stage 3B. The configuration and function of these control loops are known and do not form the subject of the present invention; consequently, they will not be described in detail herein.

It is known that a real DC/AC converter cannot guarantee conditions of operation characterized by a current and a voltage that are rigorously constant at the DC end and at the same time by a current that is perfectly in phase with the voltage at the AC end. Consequently, the bulk voltage is inevitably affected by an oscillation at the second harmonic of the network frequency at the output end, i.e. at the second harmonic of the network voltage. The aforesaid disturbance propagates through the DC/DC stage from the bulk capacitor to the terminals of the field of photovoltaic panels 1, causing an oscillation of the point of operation in the neighbourhood of the point of maximum power, with consequent degradation of the efficiency of the MPPT.

Illustrated in FIG. 3 is the time curve of the current Iout at output from the output stage 3B, i.e. the current introduced into the network and/or sent to a load connected to the converter 3. Also indicated in the same diagram is the phase reference, represented by the network voltage Vgrid. Illustrated in FIG. 4 is the corresponding curve of the bulk voltage Vbulk at input to the stage 3B. This is characterized by an oscillation at a frequency twice the frequency of the voltage Vgrid. When the network is an electric-power-distribution network typically at 50 or 60 Hz, the bulk voltage Vbulk consequently has an oscillation at 100 or 120 Hz superimposed upon a constant value.

In general, the second harmonic of the network frequency can be adequately attenuated using appropriately sized interface capacitors. In particular, the instantaneous power in sinusoidal steady-state conditions has a mean component and a component oscillating at a frequency twice the fundamental frequency. For balance in power between the input and output of an inverter, it is necessary that also the input power should present these characteristics. The aim is to maintain the amplitude of the oscillation at the second harmonic on the bulk voltage at values as low as possible, compatibly with the admissible level of deformation of the output-current waveform and with acceptable values of the bulk capacitor. For this purpose, it is recalled that the sinusoidal component of the input voltage to the inverter will have an amplitude $\hat{v}$ that can be evaluated by means of the following approximate relation:

$$\hat{v} \approx \frac{P}{2 \cdot \omega \cdot V \cdot C} \quad (1)$$

where P is the mean power transferred at output, ω is the pulsation of the network voltage, V is the mean input voltage to the inverter, and C is the capacitance of the bulk capacitor designated by 11 in the diagram of FIG. 2. In the case of double-stage photovoltaic inverters, said capacitance can hence be sized using the relation:

$$C_{bulk} \approx \frac{P_{grid}}{2 \cdot \omega_{grid} \cdot V_{bulk} \cdot \hat{v}_{bulk}} \quad (2)$$

where $P_{grid}$ is the mean power delivered on the network, $V_{bulk}$ is the mean bulk voltage, and $\hat{v}_{bulk}$ is the maximum oscillation imposed on the bulk voltage. It is evident from Eq. (2) that the reduction of the oscillation at the second harmonic on the bulk voltage at very low levels involves the use of capacitors having a very high capacitance, with consequent drawbacks in terms of cost of the device. In any case, the reduction of the oscillation of the bulk voltage is not satisfactory.

To understand what negative effect this oscillation can have in terms of MPPT operation, i.e. of maintenance of the system in conditions of maximum power as, for example, the solar irradiation of the field of photovoltaic panels 1 varies, reference should be made to one of the possible MPPT algorithms that can be used for this type of control. In particular, purely by way of non-limiting example, reference may be made to the so-called "perturb-and-observe" algorithm. With reference to the diagram of FIG. 2, this algorithm characterizes the control block 5 and has the function of modifying the operating conditions of the input stage or boosting stage 3A of the converter 3 as the power irradiated on the field of photovoltaic panels 1 varies, to cause the device to operate always in conditions suitable for extracting from said field of photovoltaic panels the maximum power possible.

In practice, the traditional MPPT control with "perturb-and-observe" algorithm operates as described in what follows. Starting from a voltage Vpv across the field of photovoltaic panels 1 and hence between the input terminals of the stage 3A, the power Ppv delivered by the field of photovoltaic panels 1 is calculated via detection of the voltage Vpv and of the current Ipv delivered by the field of photovoltaic panels 1 itself. The algorithm causes, then, a slight variation of the duty cycle δ of the DC/DC converter 3A. To this variation (perturbation) corresponds a variation of the voltage Vpv and hence a displacement along the curve Pi (FIG. 1) corresponding to the instantaneous conditions of operation of the field of photovoltaic panels 1. If at this voltage variation an increase of delivered power is observed, at the next step of the control algorithm a further variation Δδ of the same sign is imposed on the duty cycle. As soon as a reduction of the power delivered by the field of photovoltaic panels corresponds to the perturbation of the duty cycle, at the next step the algorithm imposes a variation (perturbation) of the duty cycle of opposite sign.

By appropriately choosing the sampling step (i.e. the interval of time between one perturbation and the next) also according to times of settling of the converter 3A, as well as of the degree of the variation of the duty cycle, the algorithm is ideally able to control efficiently operation of the system, maintaining it always in the condition of delivering the maximum power. In fact, the perturbations on the duty cycle that impose a perturbation of the voltage across the field of photovoltaic panels cause an oscillation of the power at output, and hence, by imposing given perturbations at pre-set intervals, it is possible to cause the voltage Vpv to oscillate around the point of maximum of the curve Pi corresponding to the condition of instantaneous irradiation. When the irradiation changes, for example on account of the passage of a cloud that partially reduces the insolation, the system passes onto a different curve Pi. The algorithm causes the system again to operate in the neighbourhood of the maximum of the new curve Pi.

The foregoing is true in the ideal case of absence of oscillations of the voltage Vpv induced by an oscillation at the second harmonic on the bulk voltage Vbulk. However, when said oscillations are present, they reflect upon the operation of the MPPT algorithm, in so far as the voltage Vpv across the field of photovoltaic panels undergoes a variation that is given by the superimposition of the perturbation induced by the oscillation on the pulsation 2ω (twice the network voltage) on the input voltage of the stage 3A, with the perturbation induced by the programmed duty-cycle variation.

FIG. 5(a) illustrates the time diagrams of the voltage Vpv, the current Ipv, and the power Ppv, delivered by the field of photovoltaic panels 1 detected on a traditional inverter controlled by the MPPT algorithm of the "perturb-and-observe"

type, connected to a network at a frequency of 50 Hz. FIG. 5(b) shows an enlargement of a portion of each of the diagrams of FIG. 5(a). It may readily be noted how upon the perturbation induced by the MPPT algorithm there is superimposed an oscillation at 100 Hz. The system works in an incorrect way in so far as it is not possible to identify the point of maximum power that can be supplied. The consequence of this is that a converter that operates in this way is not able to extract from the field of photovoltaic panels 1 all the power that it could in actual fact deliver at every condition of insolation.

In practice, in the specific case where the source of electric power is a renewable source represented by a field of photovoltaic panels, the preferential point of operation is represented by the point at which the maximum electric power can be extracted, and said point is identified by a particular value of the voltage across the field of photovoltaic panels, a value that changes when the conditions of insolation, i.e. the power incident on the field of photovoltaic panels, change. The variation of the insolation represents a non-controllable event.

In other situations, similar circumstances may arise. For example, in the case where the electric-power source is a battery of accumulator cells, the preferential point of operation can vary with the progressive running-down of the individual cells. Said progressive running-down is not necessarily uniform for all the cells and represents, in this case, the non-controllable event. Likewise, there may arise a situation of this sort in the case of fuel cells, where the non-controllable event can be constituted by the flow of one of the gases with which the cell is made to function.

In all the above situations, the block that controls the inverter so as to maintain the system in the preferential point of operation can present an even markedly reduced efficiency on account of disturbances coming from the electrical network to which the inverter is connected and on which the current generated by the source is introduced.

OBJECTS AND SUMMARY OF THE INVENTION

The object of the present invention is to provide a device and a control method that will enable a substantial reduction of this drawback by optimizing the delivery of power from a system for producing electric power from renewable sources, especially photovoltaic panels, or more in general by optimizing the control of the source, via a more accurate maintenance of the preferential point of operation.

According to a first aspect, the invention envisages a system for generating electric power, comprising:
  a source of electric power, having a preferential point of operation, to which there corresponds a parameter that can vary as a function of at least one non-controllable event;
  a double-stage inverter, which transfers energy from the source to an external AC-voltage electrical network; in which the double-stage inverter comprises, as first stage, a DC/DC voltage-boosting converter, controlled via a control parameter and, as second stage, a DC/AC inverter;
  a block for identifying the preferential point of operation, said block supplying a reference signal according to the conditions of actual operation of the electric-power source and according to the preferential point of operation of said source;
  a corrector block, provided for setting the control parameter for the boost converter according to the reference signal supplied by the block for identifying the preferential point of operation and according to a signal of actual operation of the electric-power source.

The corrector block basically constitutes a regulator which, by acting on the control parameter for the boost converter, maintains the source in the proximity of the preferential point of operation. The corrector block is designed to suppress or reduce the effect on the reference signal of at least one disturbance at a pre-determined frequency, coming from the electrical network to which the output of said inverter is connected. Typically, said disturbance is an oscillation at twice the network frequency that is superimposed on a continuous value of the input voltage of the inverter (bulk voltage) and that propagates through the booster stage towards the input of the latter.

Typically, but not exclusively, according to a possible form of application of the invention, the electric-power source comprises at least one field of photovoltaic panels, and the preferential point of operation is the point of maximum power delivery. In this case, the variable parameter is constituted by the voltage across the field of photovoltaic panels, which varies according to the solar power incident on said field of photovoltaic panels, to different conditions of insolation corresponding different values of the voltage, which each time identify the preferential point of operation.

The source may also be a different source, for example a complex of fuel cells, the preferential point of operation of which is defined by the conditions of operation in which the source supplies the maximum efficiency or performance.

In principle, the preferential point of operation is detectable via observation of the current and of the voltage at output from the electric-power source. On the other hand, it is not excluded that said preferential point of operation can be identified also via detection of other physical parameters of the system at the point of exchange with the outside world.

When the preferential point of operation is constituted by the point in which the maximum power is extracted from the source, said preferential point of operation is advantageously identified by a block that executes an MPPT algorithm, for example (but not exclusively) a perturb-and-observe algorithm.

In an advantageous embodiment, the block for identifying the preferential point of operation can, for example, supply a reference voltage across the field of photovoltaic panels, and the corrector block can be structured for determining the value of the parameter for controlling the boost converter as a function of said reference voltage and of the actual voltage across the field of photovoltaic panels.

The parameter for controlling the boost converter may for example be the frequency or, more preferably, the duty cycle of said boost converter.

When the disturbance that is to be reduced or suppressed is represented by a pulsation of the bulk voltage between the two stages of the inverter at a frequency equal to twice the network frequency (second harmonic of the network frequency), it is advantageous to envisage that the corrector block comprises a regulator with a passband higher than the second harmonic of the network voltage. In general, the regulator will advantageously have a passband higher than the frequency of the disturbance that it is intended to reduce or suppress.

According to a different aspect, the invention relates to a method for controlling operation of an electric-power source having a preferential point of operation correlated to at least one parameter that can vary as a function of at least one non-controllable event, comprising the steps of:

extracting DC power at an output voltage from said source;
boosting the voltage from the output value of said source to a higher value by means of a DC/DC boost converter;
converting said d.c. voltage into an AC voltage by means of an inverter;
introducing the power at output from the inverter into an AC-voltage electrical network to which the output of said inverter is connected;
generating a reference signal, which is a function of the conditions of operation of the electric-power source and of the preferential point of operation of said source;
comparing said reference signal with a signal which is a function of a parameter of actual operation of the electric-power source and generating an error signal; and
as a function of said error signal, regulating a control parameter of said boost converter via a corrector block designed to suppress or reduce the effect on said reference signal of at least one disturbance at a pre-determined frequency, coming from the electrical network to which the output of said inverter is connected.

Further advantageous characteristics and embodiments of the system and of the method according to the invention are described in what follows and specified in the annexed claims.

BRIEF DESCRIPTION OF THE DRAWINGS

The invention will be better understood from the ensuing description and the attached drawings, which show a non-limiting practical embodiment of the invention. More in particular, in the drawings:

FIGS. 1 to 4 and 5(a) and 5(b) are diagrams illustrating the state of the art;

FIGS. 12 to 26 are diagrams showing the experimental results obtained with a device according to the invention in a first set of tests;

DETAILED DESCRIPTION OF THE PREFERRED EMBODIMENT OF THE INVENTION

Figure 1:
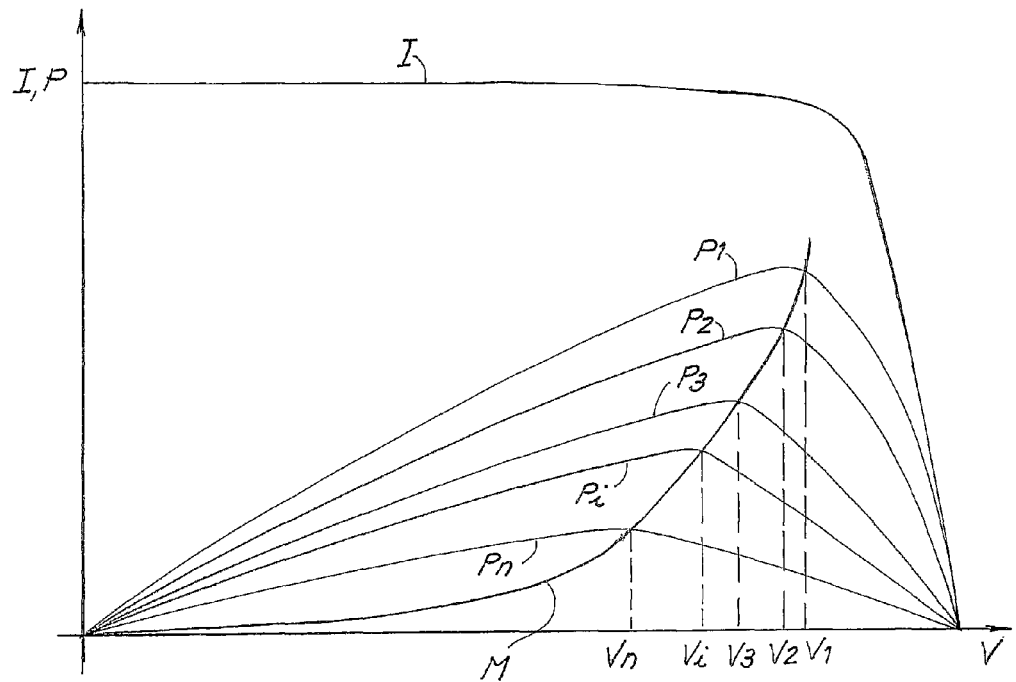
Figure 2:
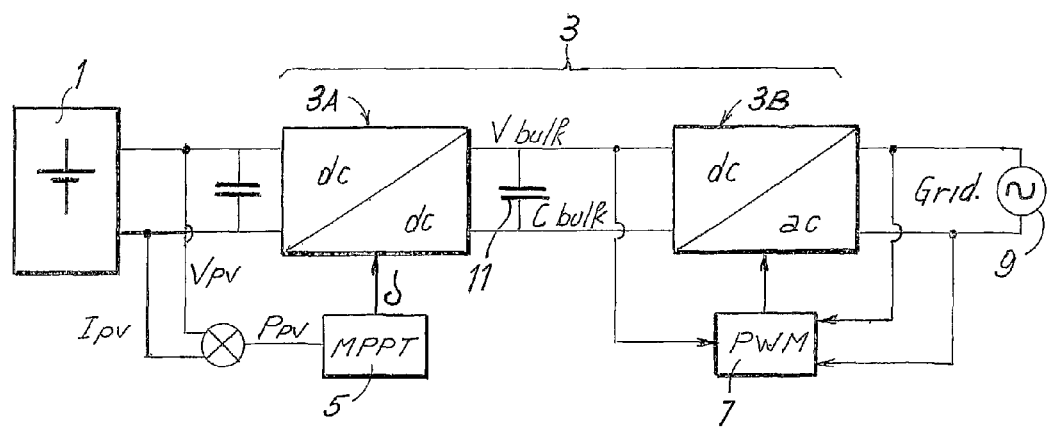
Figure 3:
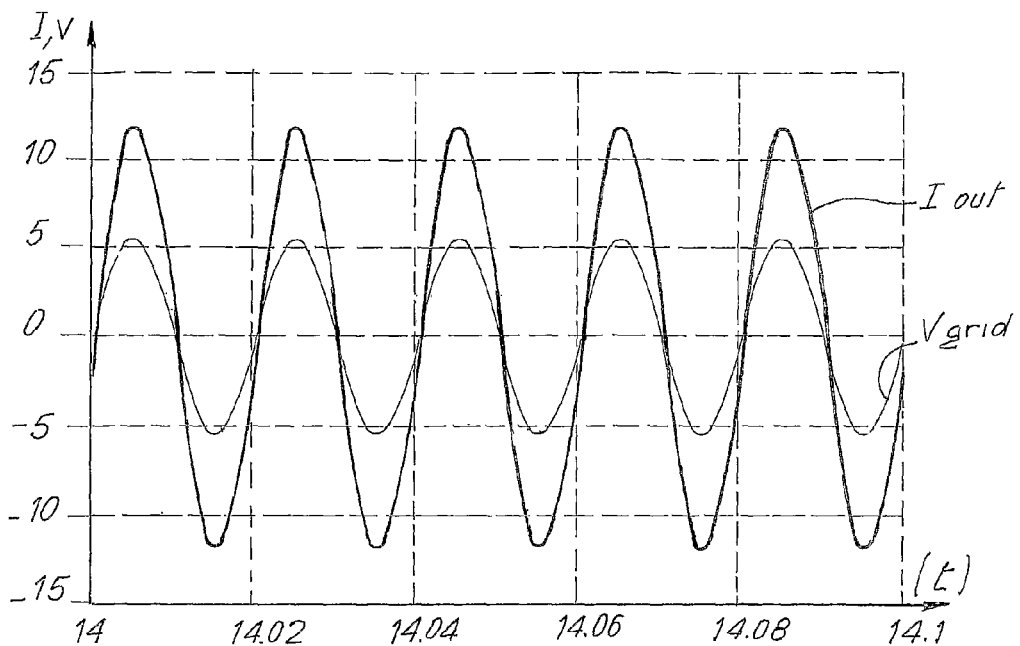
Figure 4:
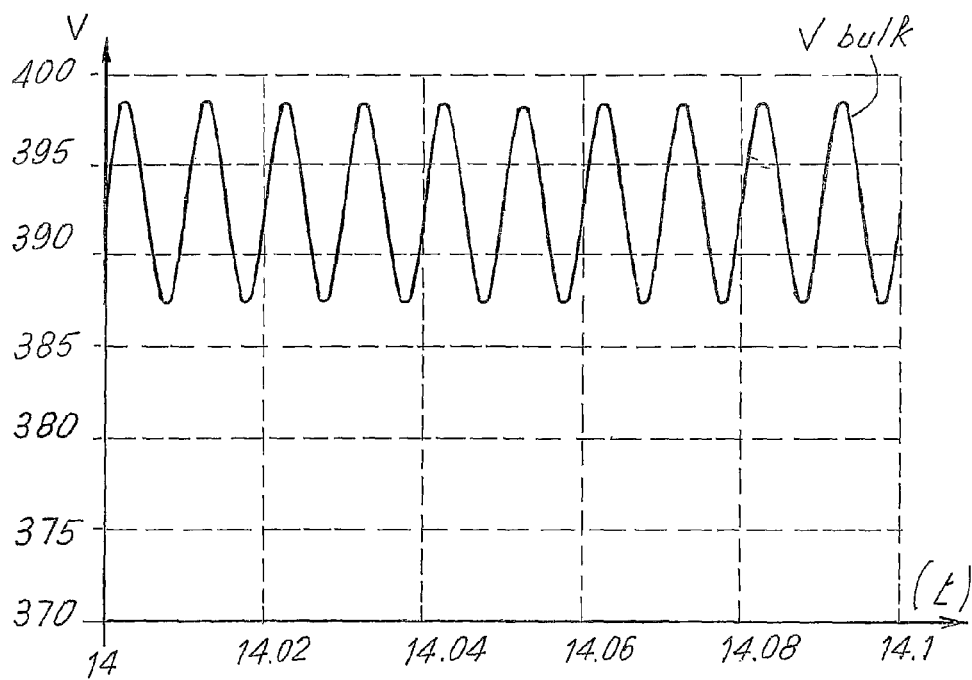
Figure 6:
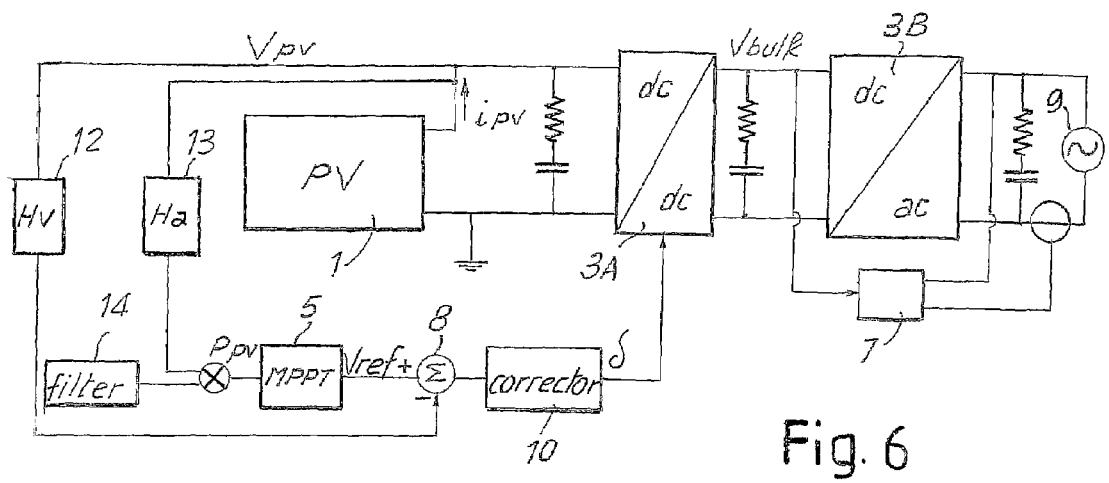
FIG. 6 is a block diagram of the device according to the invention.

FIG. 6 shows a block diagram of a converter for photovoltaic panels modified according to the present invention. With the same notation used in FIG. 2, designated by 1 is the field of photovoltaic panels and by 3 the converter comprising an input or boosting stage 3A, and an output stage 3B of interface to the network, which is represented schematically by a voltage source 9. The stage 3A is constituted by a DC/DC converter, which sees to boosting the output voltage of the field of photovoltaic panels 1 to the programmed input bulk voltage (Vbulk) of the second stage 3B, which is constituted by a DC/AC inverter. Designated as a whole by 5 is a control block that executes an MPPT function, and designated by 7 is a block for controlling the DC/AC inverter, which maintains the current at output from the inverter in phase with the network voltage, the electrical network being schematically represented by a voltage source 9. The control block 7 comprises the output-current-phase control loop and the loop for control of the bulk voltage at input to the stage 3B.

As may be noted in FIG. 6, starting from the values of current delivered by the field of photovoltaic panels (ipv) and from the voltage across said field of photovoltaic panels (vpv), and hence from the power (ppv) delivered by the field of photovoltaic panels 1, the block 5 calculates a reference voltage Vref. This value is calculated using any MPPT algorithm, for example an algorithm of the perturb-and-observe type, even though other algorithms can be used for the same purpose. The value of voltage Vref is summed by an adder 6 to the value vpv of the voltage across the field of photovoltaic panels, appropriately scaled by means of a resistive voltage sensor 12, and, via a regulator designated by 10, the variation to impose upon the duty cycle δ of the converter 3A is calculated. Designated by 13 is a current sensor.

Figure 7:
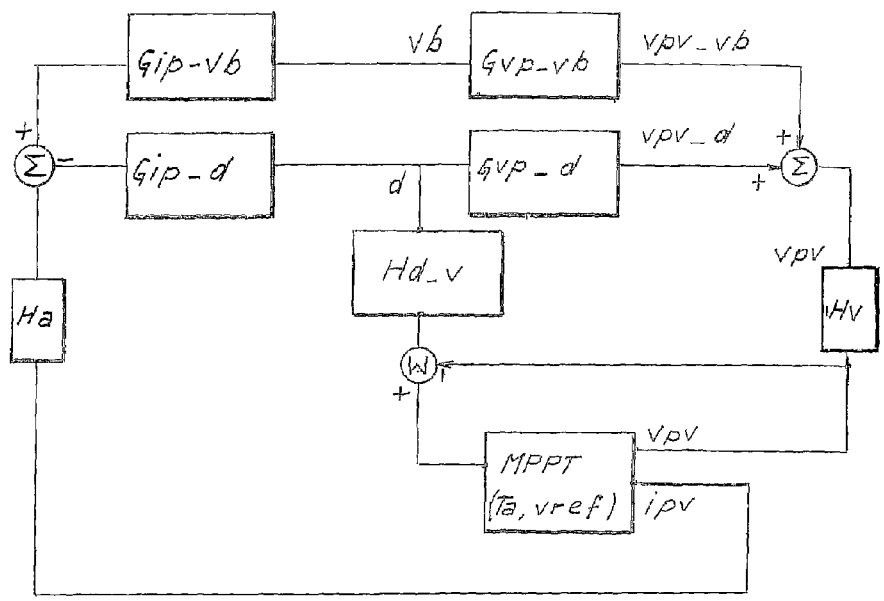
FIG. 7 is a block diagram of the network for controlling the device of FIG. 6.

FIG. 7 illustrates the block diagram of the system made up of the field of photovoltaic panels and by the DC/DC converter 3A, where the transfer functions that are important for the purposes of controlling the converter 3A are highlighted. In FIG. 7:

$G_{vp\_vb}$ is a transfer function between the voltage vpv of the field of photovoltaic panels and the output bulk voltage vb of the converter, i.e. the function representing the relation between the disturbances at output from the converter and the voltage across the field of photovoltaic panels;

$G_{vp\_d}$ is a transfer function between the voltage vpv of the field of photovoltaic panels and the duty cycle δ;

$G_{ip\_vb}$ is a transfer function between the current ipv of the field of photovoltaic panels and the output bulk voltage vb of the converter, i.e. the function representing the relation between the disturbance at output from the converter and the current of the field of photovoltaic panels;

$G_{ip\_d}$ is a transfer function between the current ipv of the field of photovoltaic panels and the duty cycle δ;

$H_{d\_v}$ is a transfer function between the duty cycle and the control or reference voltage vref;

Ta is the sampling time interval of the MPPT algorithm;

The MPPT control forming the subject of the inventive idea can be described by the relation:

$$V_{ref((k+1)T_a)} = V_{ref(kT_a)} \pm \Delta V_{ref}$$

where $\Delta V_{ref}$ is the variation of the reference voltage Vref imposed at each step by the MPPT algorithm.

The compensator 10 is designed so that the closed-loop system will have a passband at least equal to twice the network frequency ω and so that, at that frequency, it will present a sufficiently high gain so as to reduce the effect of disturbance on the voltage across the field of photovoltaic panels 1 induced by the oscillations of the bulk voltage Vbulk at output from the converter 3A.

For the purpose of experimenting the principle set forth above, a prototype of a low-power MPPT boost converter was used, which was designed and built at the Laboratory of Electronic Power Circuits of the Department of Information-technology Engineering and Electrical Engineering of the University of Salerno and is the property of the same department, said boost converter being supplied by a Kyocera KC120 panel and terminated on a load constituted by a stationary generator connected in series to a disturbance generator capable of emulating a sinusoidal waveform of programmable amplitude and with a frequency of 100 Hz.

Considering the characteristics of the panel used for testing, a mean output voltage of the converter of 30 V, higher than the maximum voltage of the maximum power of the panel, and a maximum voltage ripple equal to 4% were assumed. The prototype used is the fruit of the analysis of different possible solutions of implementation evaluated for the purpose of guaranteeing a CCM operating mode of the converter starting from a minimum level of insolation of 100 W/m² and an efficiency higher than 90% at all the levels of insolation.

The MPPT control of the prototype has been obtained via software on a microprocessor system. A sampling step $T_a$ for updating the maximum-power point of operation of 5 ms was adopted, which is higher than the settling time of the DC/DC converter, namely approximately 3 ms.

Figure 8:
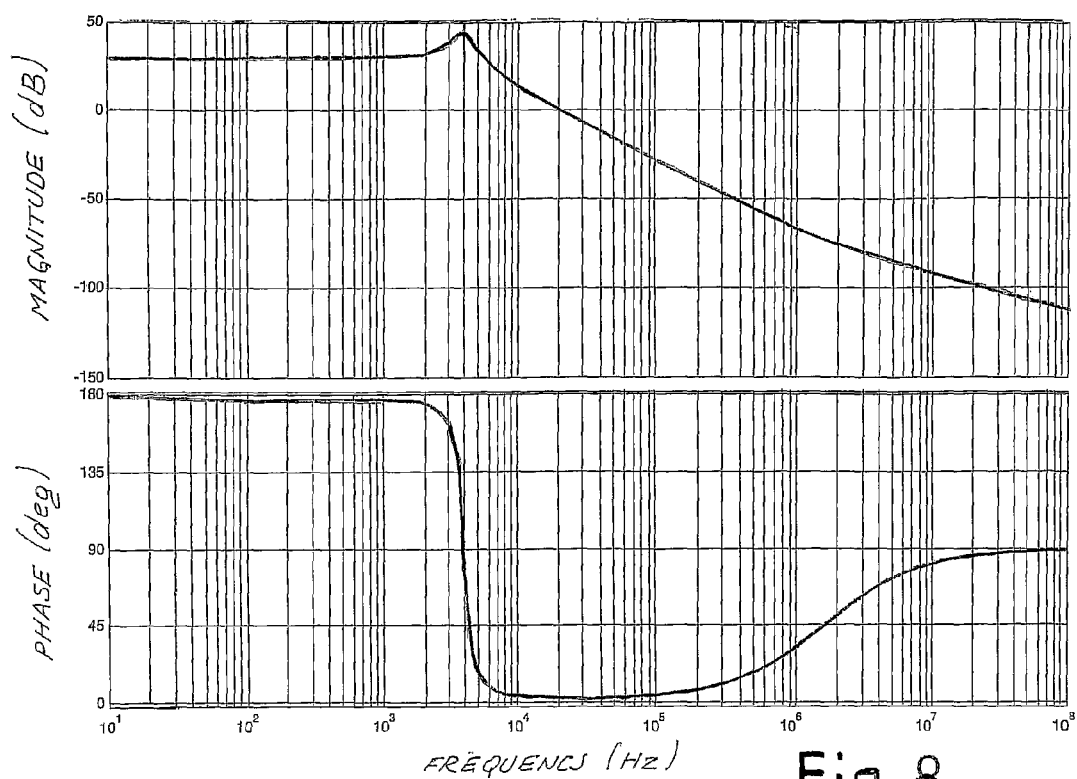
FIGS. 8 to 11 are Bode diagrams of the transfer functions of the various blocks of the control network represented schematically in FIG. 7.

The transfer function of the compensating network of the prototype was calculated starting from the worst operating condition:

$$V_{MPP}=15.3 \text{ V } I_{MPP}=0.34 \text{ A}.$$

at which the open-loop transfer function $G_{vp\_d}(s)$ (see the transfer functions indicated in FIG. 7) of the compensation network (compensator) presents the Bode diagram appearing in FIG. 8.

Figure 9:
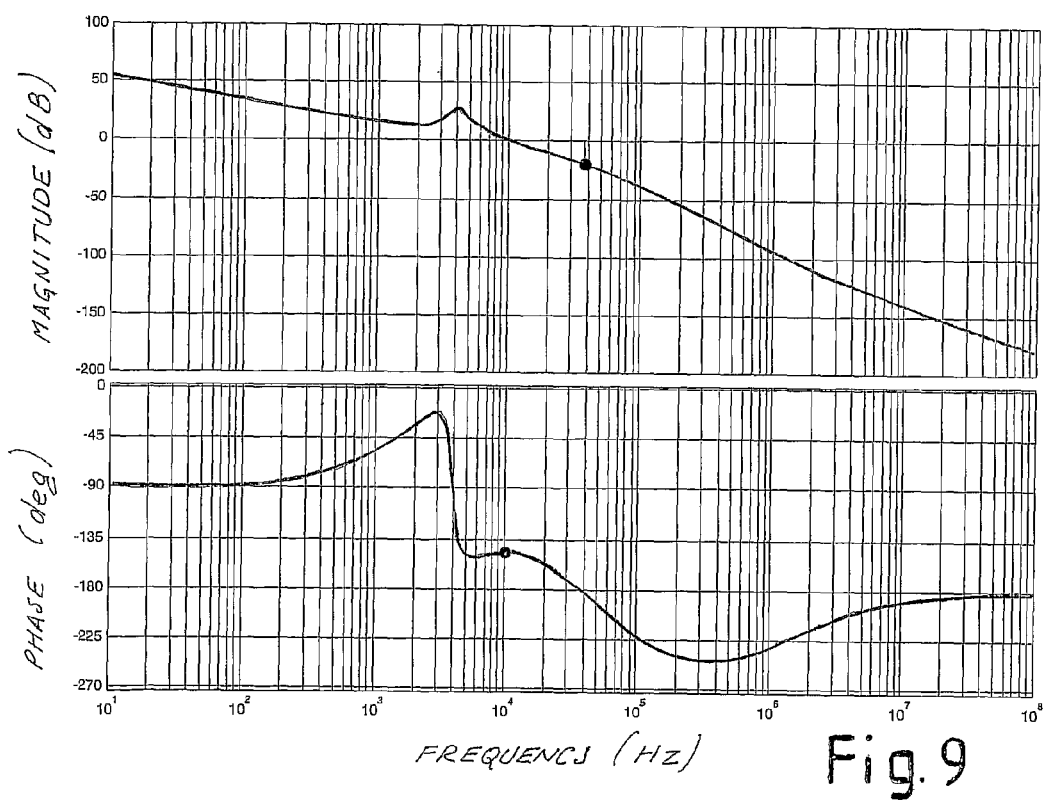
Figure 10:
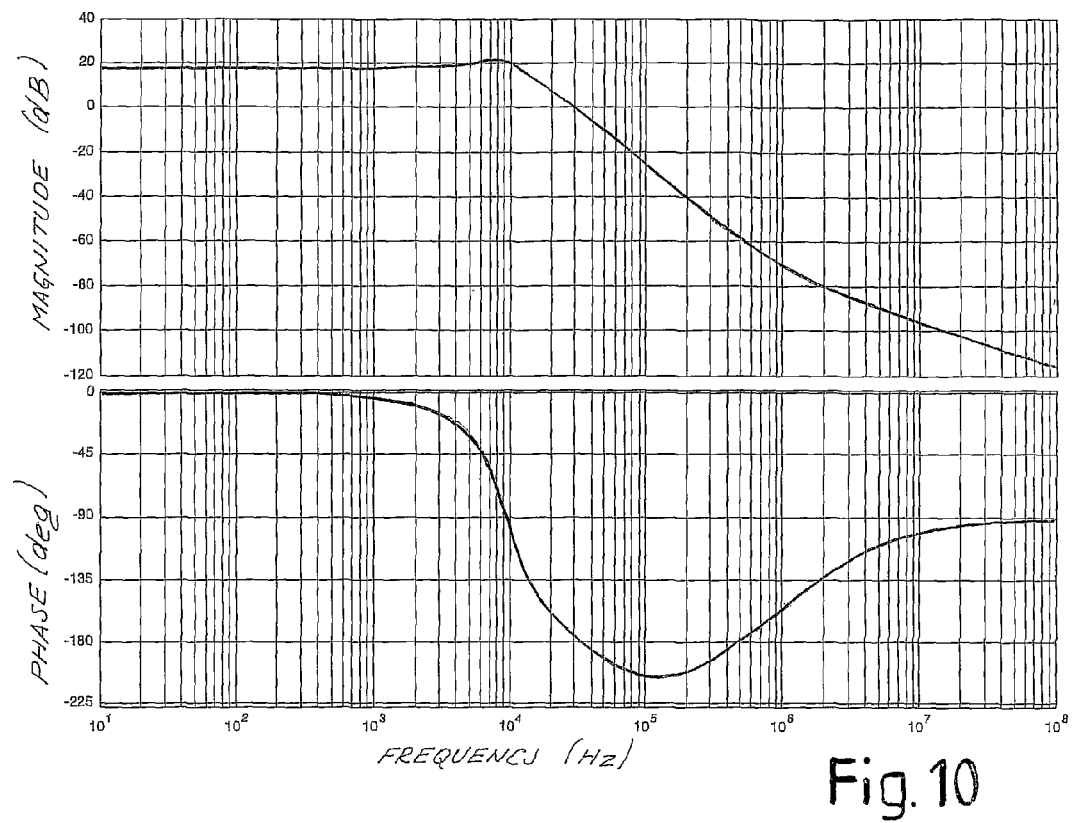

The transfer function of the compensator was designed with one pole at the origin, two zeros at $f_{z1}$=2.5 kHz and $f_{z2}$=2.8 kHz, two poles at $f_{p1}$=40 kHz and $f_{p2}$=36 kHz, and a gain such as to guarantee, for the transfer function corresponding to the loop gain T, a crossover frequency $f_c$=10 kHz with a phase margin of approximately 35°. Appearing in FIGS. 9 to 11 are the Bode diagrams of the closed-loop transfer function T (FIG. 9), of the transfer function $G_{vp\_vref\_cl}$ (FIG. 10) between the panel voltage vpv and the reference voltage vref, and of the transfer function $G_{vp\_vb\_cl}$ (FIG. 11) between the panel voltage vpv and the bulk voltage vb, evaluated in the worst operating condition.

The Bode diagram of the magnitude of the transfer function $G_{vp\_vref\_cl}$ (FIG. 10) highlights, if compared with the diagram of the magnitude of the transfer function $G_{vp\_d}$ appearing in FIG. 8, an increase in the band of the system, and a sensible attenuation of the Q factor. As a consequence of this, it is possible to achieve a more rapid tracking and a more accurate maintenance of the preferential point of operation.

Figure 11:
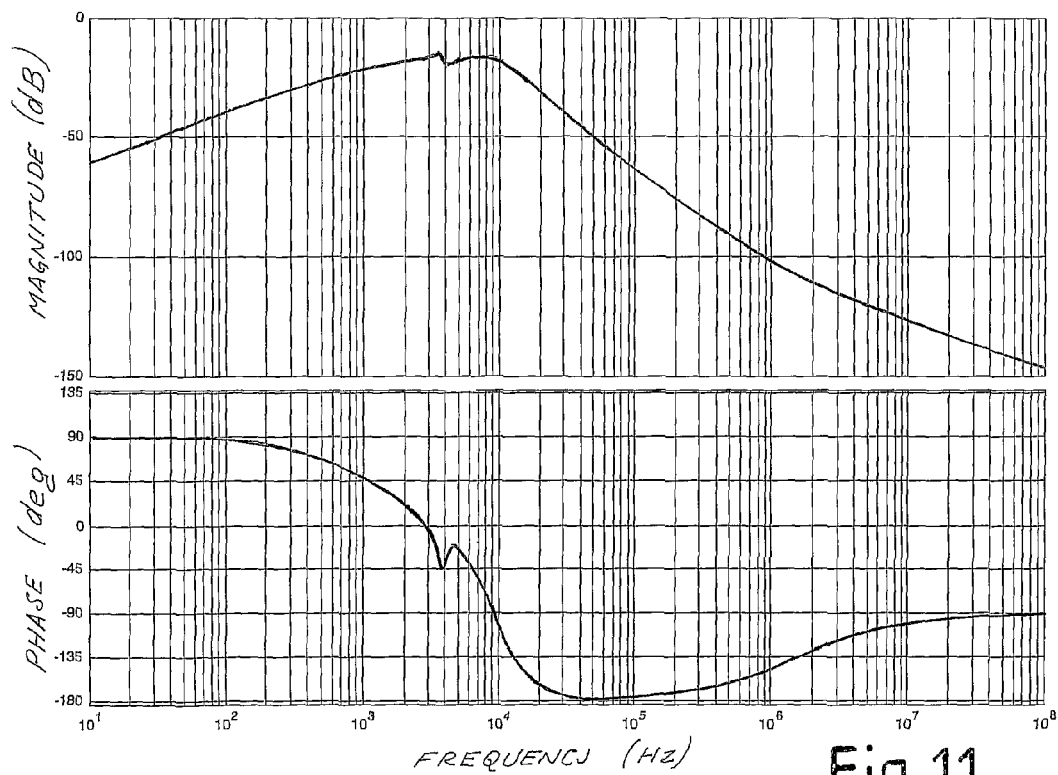
Figure 12:
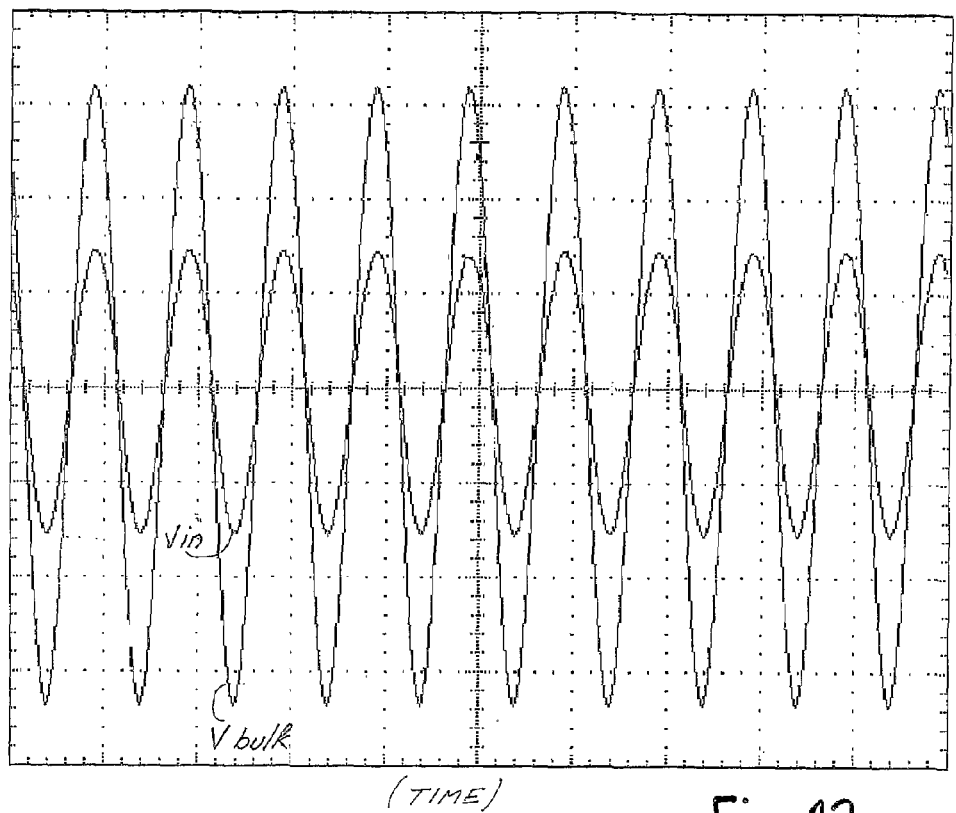
Figure 13:
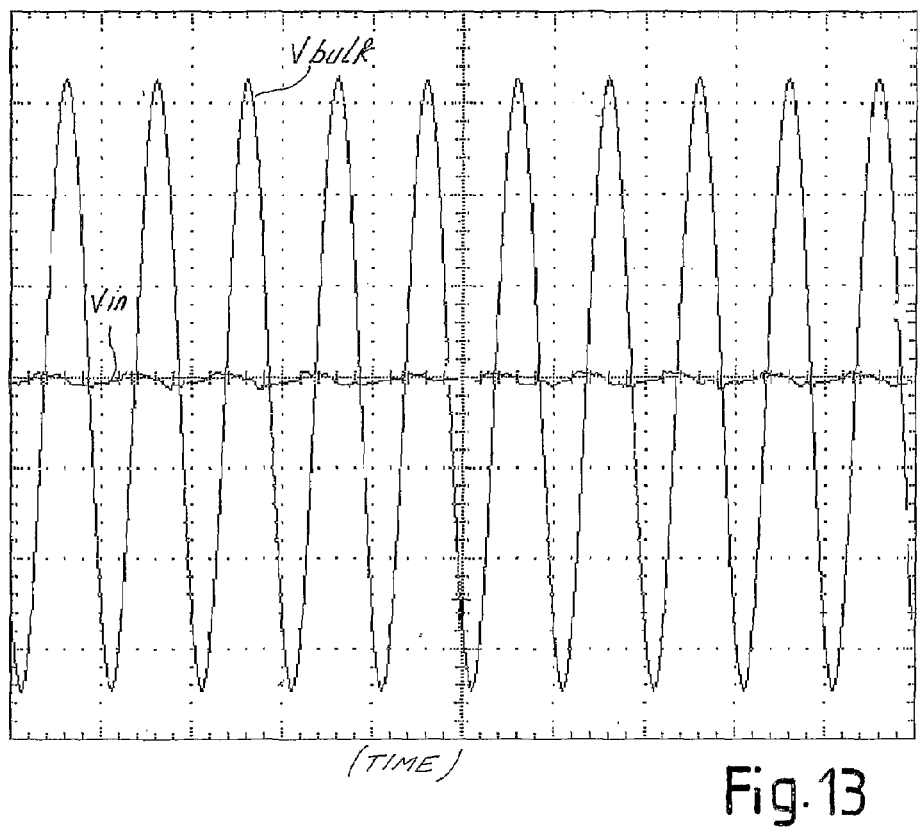

The Bode diagram of the magnitude of the transfer function $G_{vp\_vb\_cl}$ of FIG. 11 highlights an attenuation of approximately 40 dB at the frequency of 100 Hz and a little lower at the frequency of 120 Hz.

Appearing in the subsequent figures are some experimental acquisitions obtained using the prototype built.

In order to highlight the capacity for rejecting the disturbances at the frequency of 100 Hz coming from the bulk voltage of the boost converter, the load was emulated by a system made up of the series of an electronic load HP6050A, configured in voltage-mode with a constant voltage of 30 V, and a power-signal generator that produces a sinusoid of amplitude higher than 6 Vpp at the frequency of 100 Hz. The load thus emulates the input voltage of an inverter connected to the national electrical grid. Appearing in FIGS. 12 to 19 are the experimental acquisitions of the alternative component of the output voltage (Vbulk) and of the input voltage (Vin) of the converter 3A. The diagrams of FIGS. 12 and 13 refer to the system operating at fixed duty cycle (FIG. 12), and at clamped reference voltage (FIG. 13) respectively, with the perturb-and-observe algorithm deactivated in both the cases, and in the presence of a disturbance of amplitude higher than 6 $V_{pp}$ at the frequency of 100 Hz superimposed upon the DC output voltage of 30 V.

Figure 14:
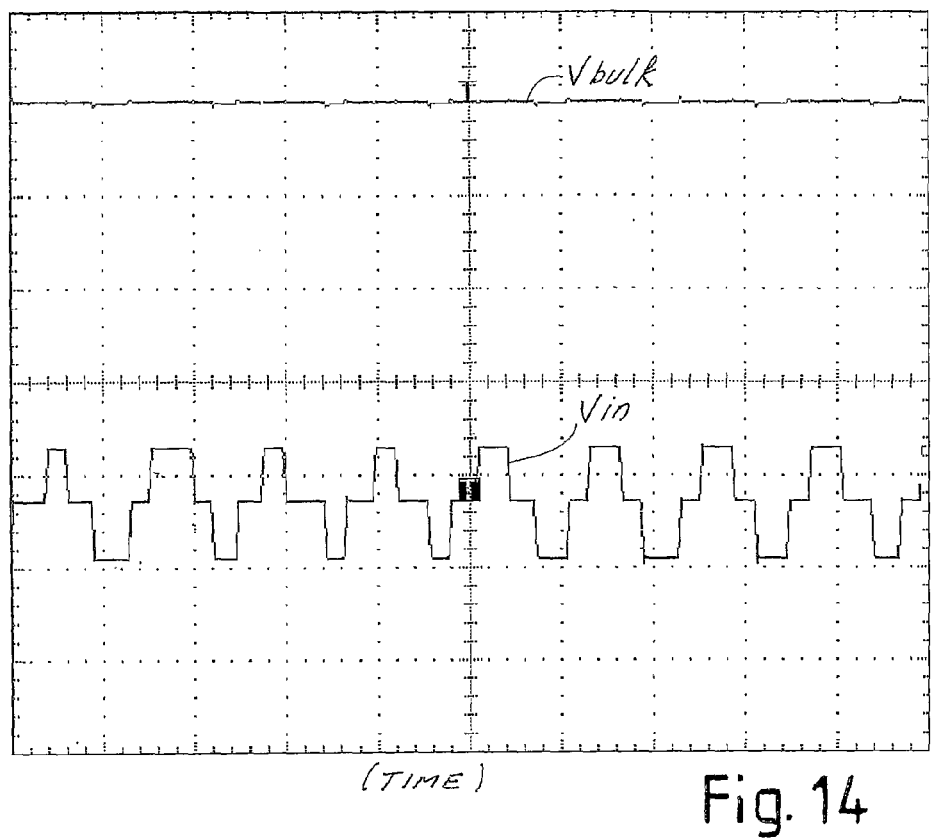
Figure 15:
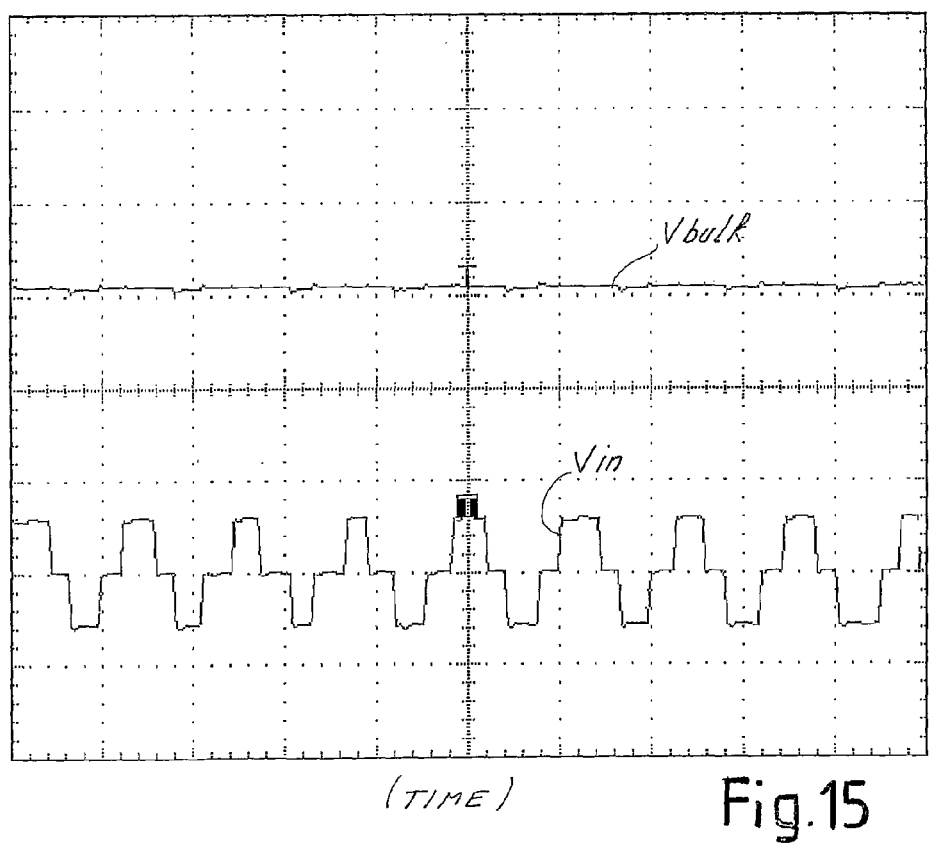
Figure 18:
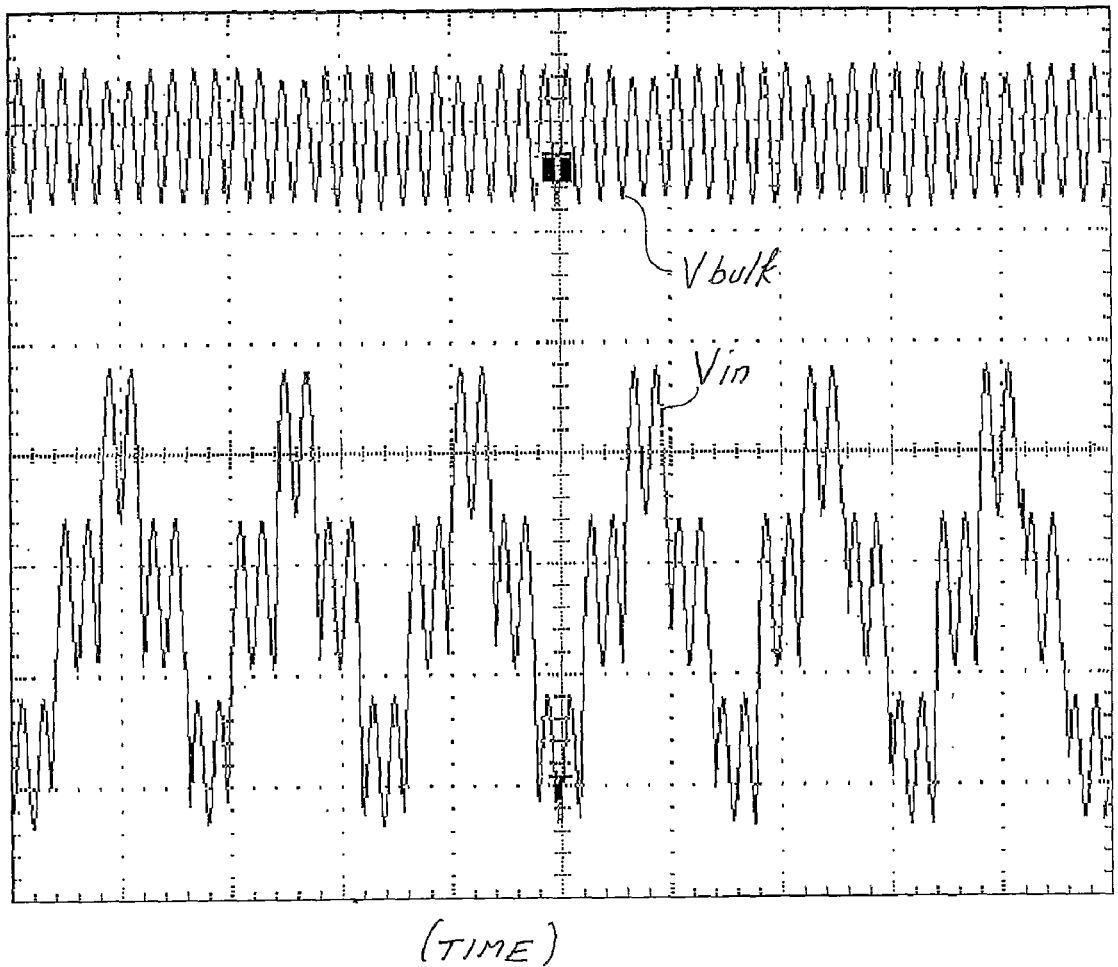
Figure 19:
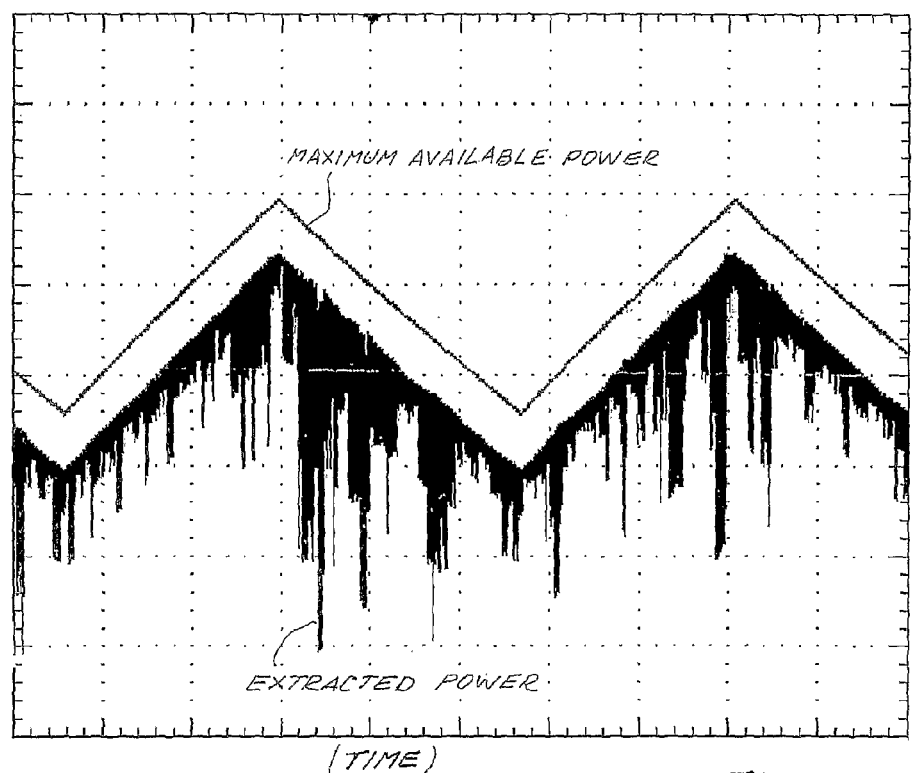

In the absence of disturbances at 100 Hz on the bulk voltage, no differences are detected on the panel voltage between the two control systems, as highlighted in FIGS. 14 and 15, obtained by activating the perturb-and-observe algorithm for both of the control techniques on the duty cycle (FIG. 14) and on the input voltage (FIG. 15), and eliminating the component at 100 Hz superimposed upon the voltage Vbulk at output from the converter 3A. The voltage at input to the converter has the classic three-level curve given by the MPPT algorithm.

The advantages of the voltage control according to the invention are evident if the output voltage has a disturbance at 100 Hz, as highlighted in FIGS. 16 and 17. Appearing in FIG. 16 are the bulk voltage Vbulk with the disturbance at 100 Hz superimposed upon the continuous value as well as the consequent evolution of the input voltage and thus of the voltage across the field of photovoltaic panels 1 determined by the effect of the perturb-and-observe algorithm based upon the direct control of the duty cycle. It may be noted that, in the waveform of the input voltage Vpv, the staircase pattern that ought to characterize the voltage controlled by the MPPT algorithm is practically unrecognizable. This occurs precisely on account of the effect on the input voltage of the disturbance present on the output voltage.

In FIG. 17, instead, it may be noted how the voltage at input to the converter 3A presents the typical three-level pattern that should characterize the MPPT control, notwithstanding the presence of a disturbance at the frequency of 100 Hz on the bulk voltage having an intensity equal to that of the disturbance present in the case of FIG. 16. In practice, then, the control on the reference voltage eliminates the effect on the input voltage of the disturbance at the second harmonic of the network voltage present on the bulk voltage.

It should be noted that the result of FIG. 17 cannot be achieved by means of the traditional MPPT direct control on the duty cycle even if the amplitude of the perturbations is increased. In fact, as highlighted in FIG. 18, in this case the oscillations at the frequency of 100 Hz remain superimposed upon the variation of three-level voltage produced by the MPPT control. The amplitude of the total oscillations around the point of maximum power is, in this case, markedly penalizing in terms of efficiency.

Figure 20:
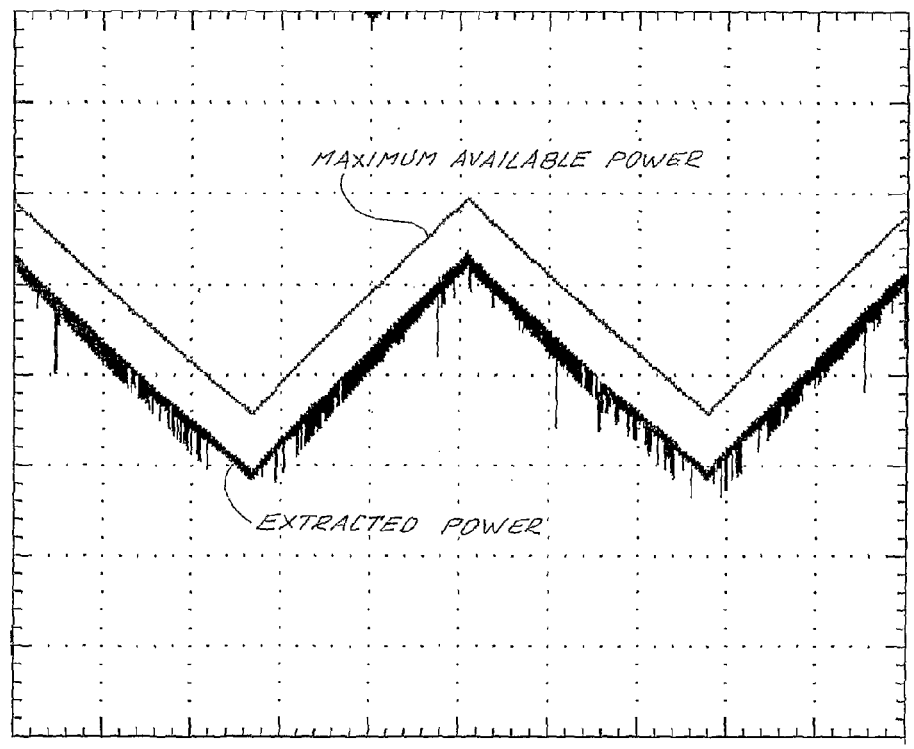

In addition to the experimental verifications made on the system supplied by a real panel and illustrated in FIGS. 12 to 18, also experimental tests were conducted using a photovoltaic-field emulator. From the experimental findings a comparison was made between the two different types of MPPT control, both of the perturb-and-observe type, the first with direct control on the duty cycle of the converter 3A and the second with control on the voltage of the photovoltaic panel by analysing the power extracted from the panel itself. By setting on the emulator a pattern of the insolation that varies from $S_{min}$=500 W/m² to $S_{max}$=1000 W/m² with a triangular waveform, the results illustrated in FIG. 19 (with control on the duty cycle) and FIG. 20 (with control on the panel voltage) were obtained.

The offset between the top curve (with triangular waveform), which represents the maximum hypothesised available power across the converter, and the bottom curve, which represents the effective power extracted from the converter, can be put down to the calibration of the emulator. The improvements in terms of efficiency of the control system passing from the control on the duty cycle to the control on the input voltage appear evident. The curve of the extracted power follows that of the available power much more faithfully in the case of FIG. 20, which means in practical terms that the control according to the invention enables extracting from the photovoltaic panel a power much closer to the theoretically available one, whilst a traditional control in duty cycle is markedly penalized by the second-harmonic disturbances on the bulk voltage, which entail a non-optimal extraction of power as a consequence of the poor operation of the MPPT algorithm.

Figure 21:
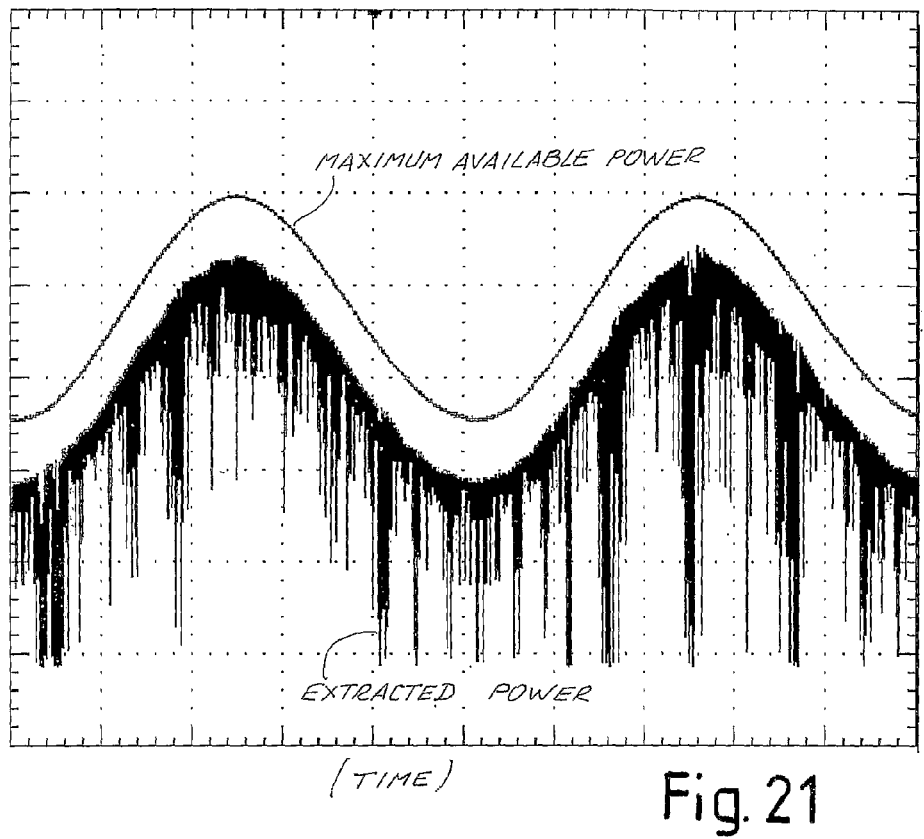
Figure 22:
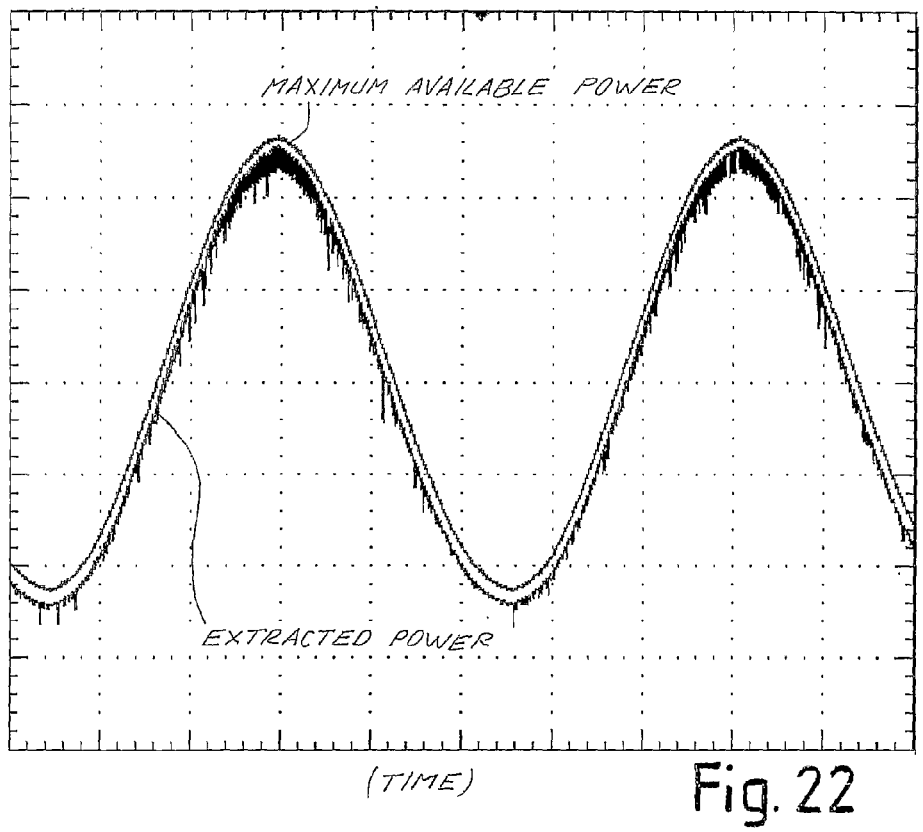

The above evidence continues to emerge from the subsequent experimental findings, obtained by setting an insolation that can vary from $S_{min}$=500 W/m² to $S_{max}$=1000 W/m² with sinusoidal waveform, appearing in FIGS. 21 and 22.

Figure 23:
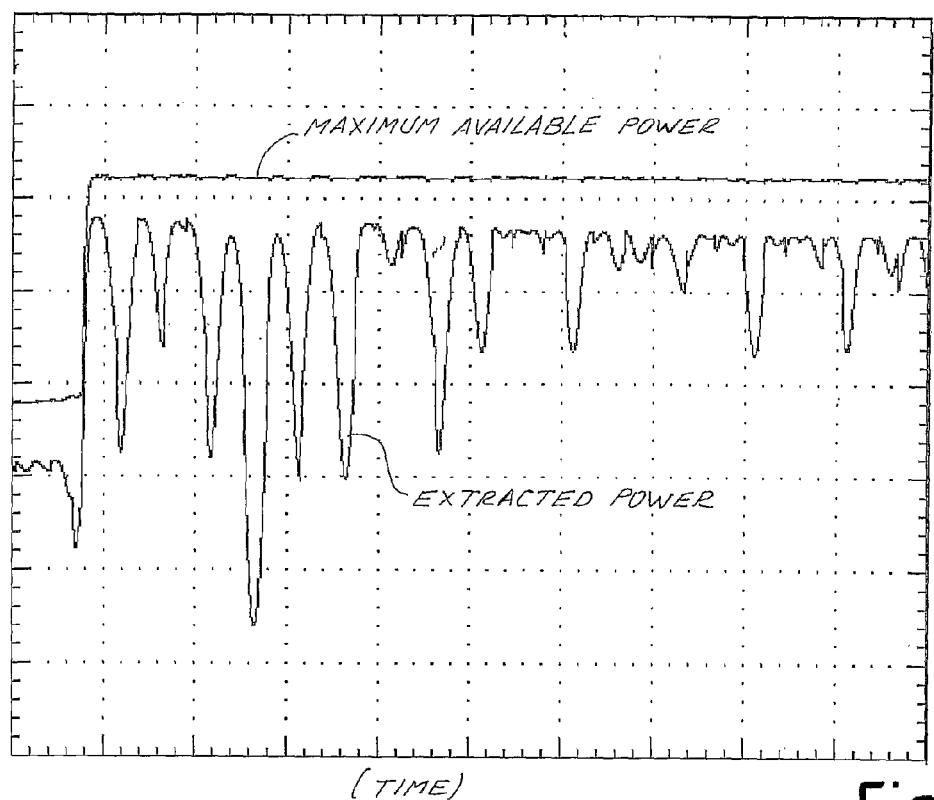
Figure 24:
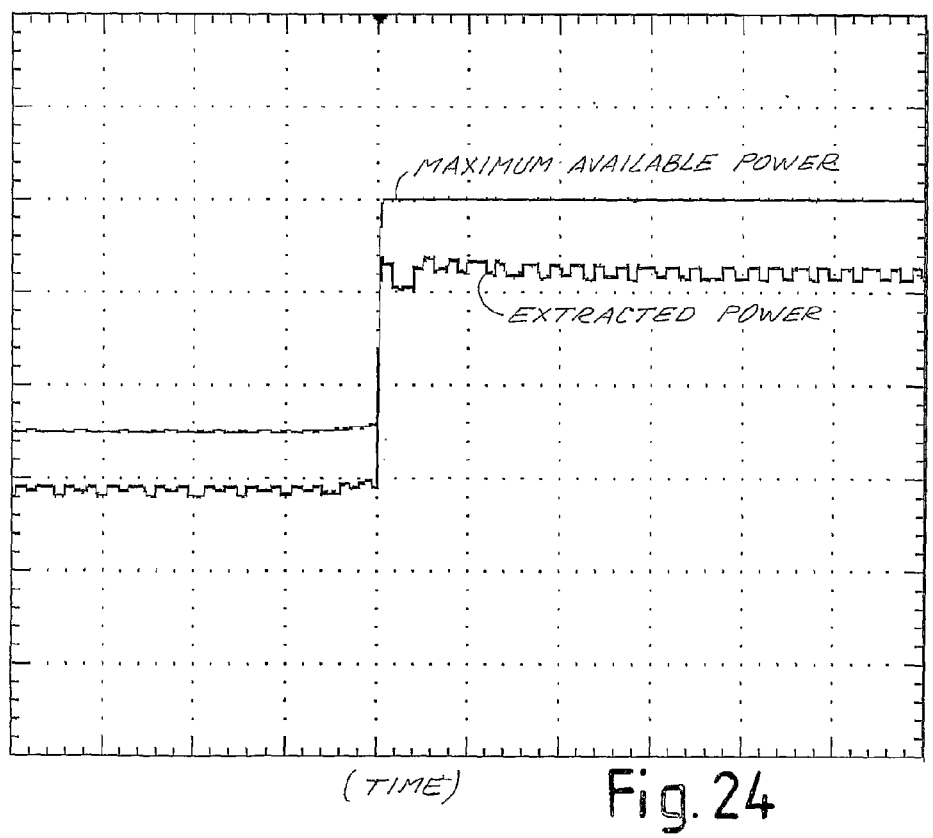
Figure 25:
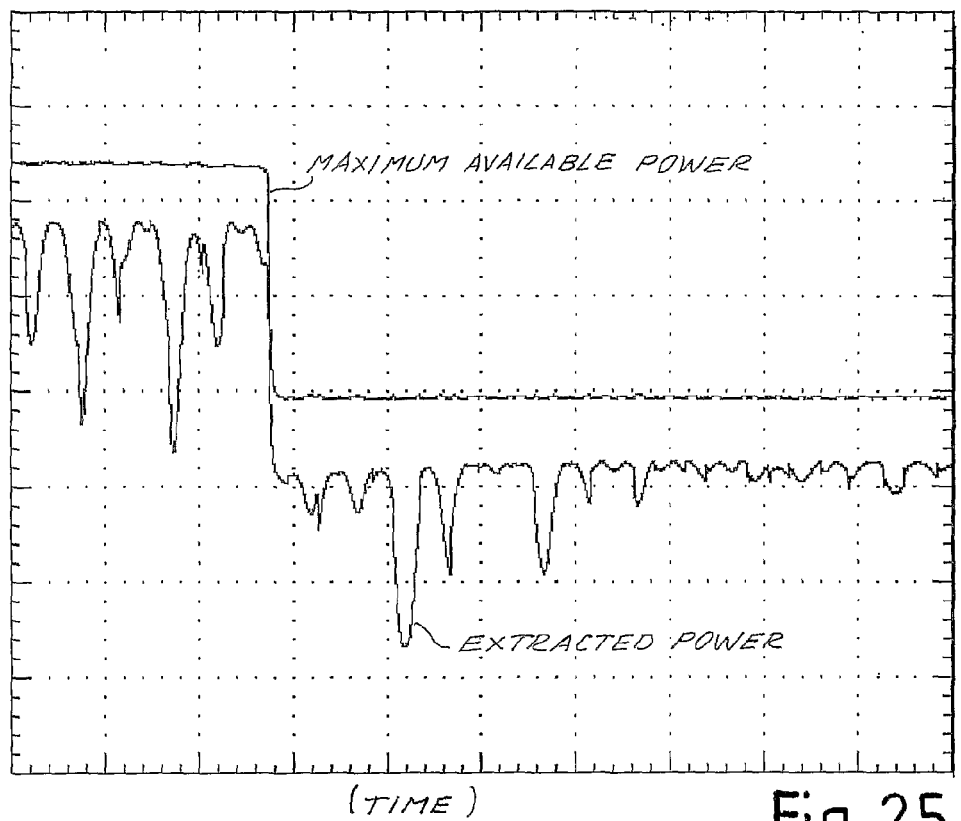
Figure 26:
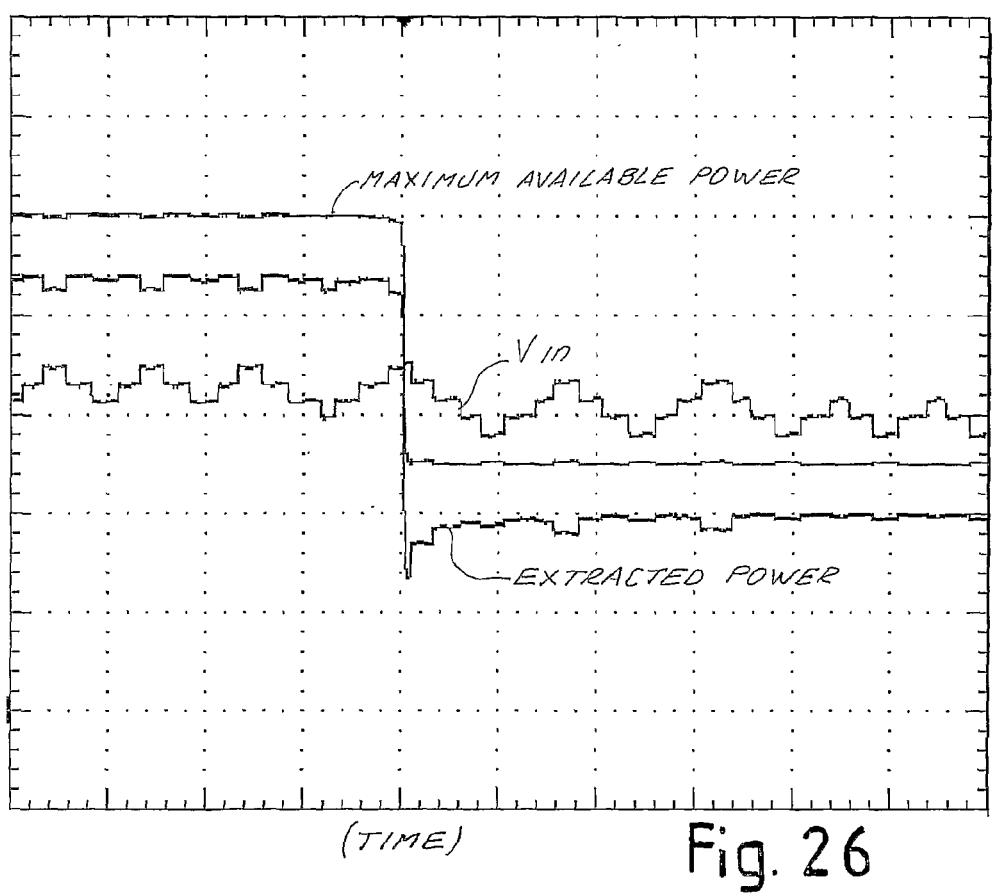

Finally, there was set an insolation that can vary from $S_{min}$=500 W/m² to $S_{max}$=1000 W/m² with square waveform. The results obtained, corresponding to the behaviour of the MPPT control at the leading and trailing edges of the insolation, appear in FIGS. 23 to 26. FIGS. 22 and 23 show the curve of the power available on the photovoltaic panel and of the power extracted at a leading edge in the case of control on the duty cycle (FIG. 23) and of control on the voltage across the panel (FIG. 24), respectively. FIGS. 25 and 26 show the difference of behaviour of the two controls at a trailing edge. Also in this case, it may be noted how the voltage control (FIGS. 24 and 26) enables extraction from the panel of a power much closer to the one really available.

Figure 27:
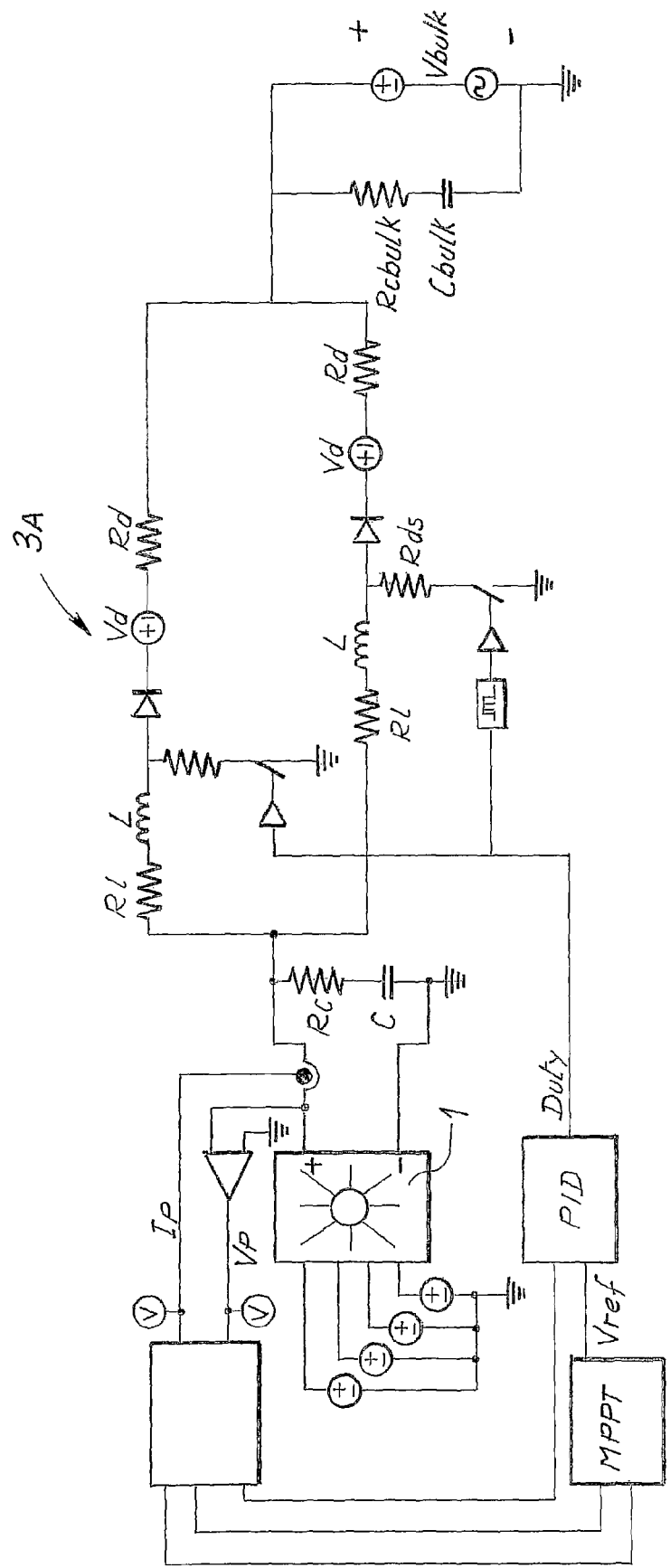
FIG. 27 is a simplified diagram of the boosting stage of a commercially available inverter on which a corrector network according to the invention has been implemented.

In a further verification of the efficiency of the method according to the present invention, the control technique forming the subject of the invention was applied for immunization from disturbance at twice the network frequency of the input stage of a double-stage photovoltaic inverter having a rated power of 6 kW, called Aurora 6 kW, produced by MagneTek S.p.A. (Italy). In this connection, an appropriate corrector network was identified, specifically studied for the aforesaid inverter on the basis of the specific circuit and functional characteristics of the inverter itself. Represented in FIG. 27 is the simplified diagram of the boosting stage of the Aurora 6-kW inverter, which includes the compensating network that provides the voltage control. The voltage Vref is supplied by the MPPT control, which sees to varying, at time intervals Ta, the aforesaid voltage by an appropriate value ΔVref. The components of the circuit diagram of FIG. 27 have the following values:
C=30 μF
Cbulk=2400 μF
L=900 μH
Rc=15 mΩ
Rcbulk=10 mΩ
Rl=300 mΩ
Rds=70 mΩ
Rd=350 mΩ
Vd=950 mV.

Figure 28:
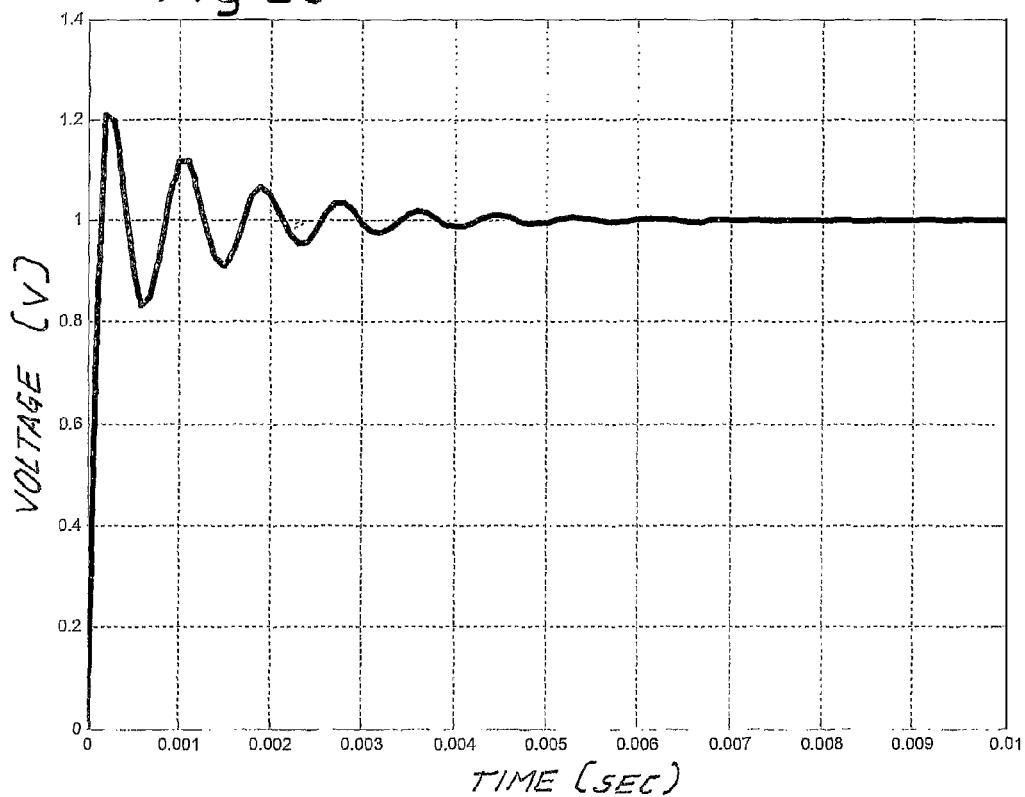
FIGS. 28 to 33 are diagrams showing the results of a simulation carried out on the inverter represented schematically in FIG. 27.

FIG. 28, obtained following upon a circuit simulation of the open-loop inverter, conducted by means of the program PSIM, with a unit-step disturbance of the reference voltage Vref, shows the settling time of the inverter Aurora 6 kW in the worst operating condition. In line with this, the value of the interval of sampling Ta was assumed as equal to 5 ms. The amplitude of the perturbation of the reference voltage ΔVref was assumed as equal to 6 V.

The transfer function of the compensator identified for the inverter Aurora 6 kW has the following expression:

$$G_c(s) = -6.4 \cdot 10^3 \frac{2.1 \cdot 10^{-8} s^2 + 0.58 \cdot 10^{-4} s + 1}{(1.8 \cdot 10^{-10} s^2 + 0.70 \cdot 10^{-5} s + 1) \cdot s}$$

Figure 29:
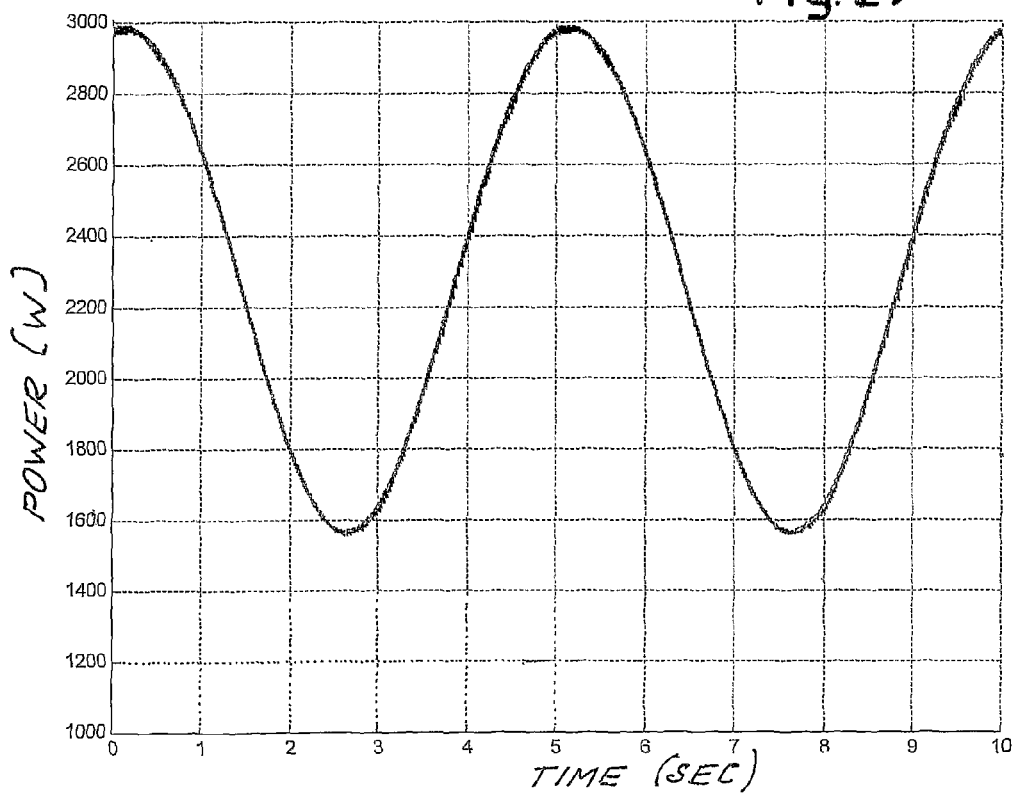
Figure 30:
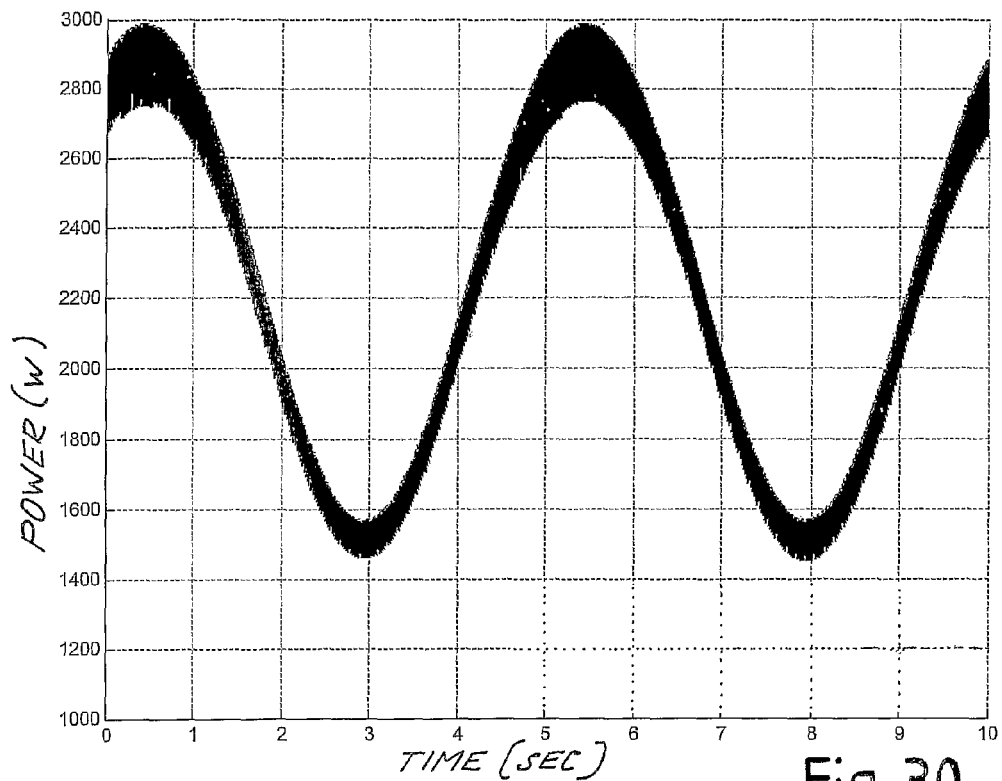

For the purpose of highlighting the performance of the inverter Aurora 6 kW with voltage control, a comparison was made between two different types of MPPT control, both of the perturb-and-observe type, the first with direct control on the duty cycle (duty mode), the second with control on the voltage of the photovoltaic field (voltage mode), which forms the subject of the present invention. FIGS. 29 and 30 illustrate the results of the simulations made using the circuit diagram of FIG. 27, assuming at input to the photovoltaic field an insolation that can vary from $S_{min}$=500 W/m² to $S_{max}$=1000 W/m² with sinusoidal waveform, in the two cases of voltage-mode control (FIG. 29) and duty-mode control (FIG. 30) and on the hypothesis that the bulk voltage has a mean value of 400 V with a disturbance of 20 V of amplitude at the frequency of 100 Hz:

$$V\text{bulk}=(400+20 \sin (2\pi fct)) \; V,$$

$$fc=100 \text{ Hz}.$$

The comparison highlights that the voltage-mode control determines a significant abatement of the oscillations of the power extracted from the photovoltaic field as compared to the duty-mode control. In FIG. 29 the curve representing the power effectively delivered substantially coincides with the curve representing the maximum available power, whilst in FIG. 30 it may be noted how the power effectively extracted from the photovoltaic field, i.e. from the photovoltaic panels, is substantially lower than the curve of the maximum power theoretically available, which represents basically the upper sinusoidal envelope.

Figure 31:
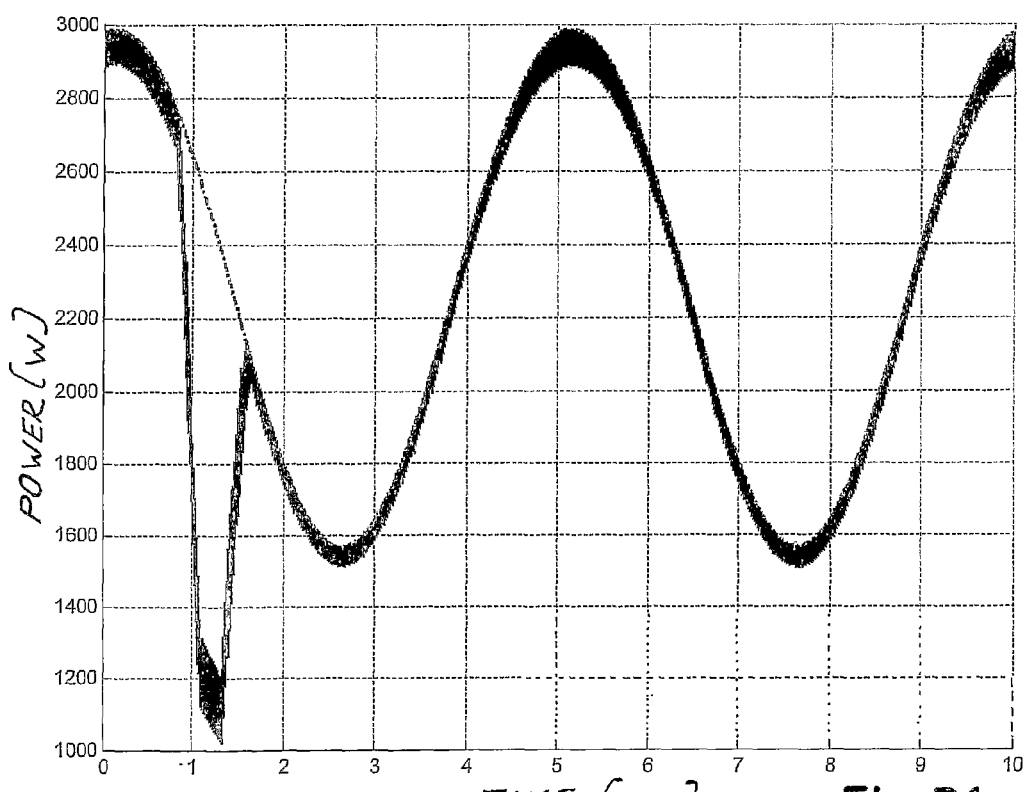

It should be noted that the value of the amplitude of the perturbation on the duty cycle in the duty-mode case was fixed at Δδ=0.045 equivalent to ΔVref=18 V. The value Δδ in the duty mode is subject to a lower limitation deriving from the need to guarantee a robust operation of the system. The violation of said limitation, aimed at the possible containment of the amplitude of the oscillations of the field voltage in order to achieve a greater efficiency of MPPT, would determine conditions of poor reliability, with the possibility of temporary loss of the MPPT control and consequent degradation of the effective energy yield on account of the greater sensitivity of the system. Appearing by way of example in FIG. 31 is the diagram of power in the duty-mode case with Δδ=0.015, corresponding to an amplitude of perturbation ΔVref of the voltage Vref equal to 6 V, adopted in the voltage mode. There may be noted the better performance of the duty-mode MPPT with lower Δδ (but in any case worse than that of the voltage mode) valid only as long as anomalous situations of loss of the control do not arise (see FIG. 31).

Figure 32:
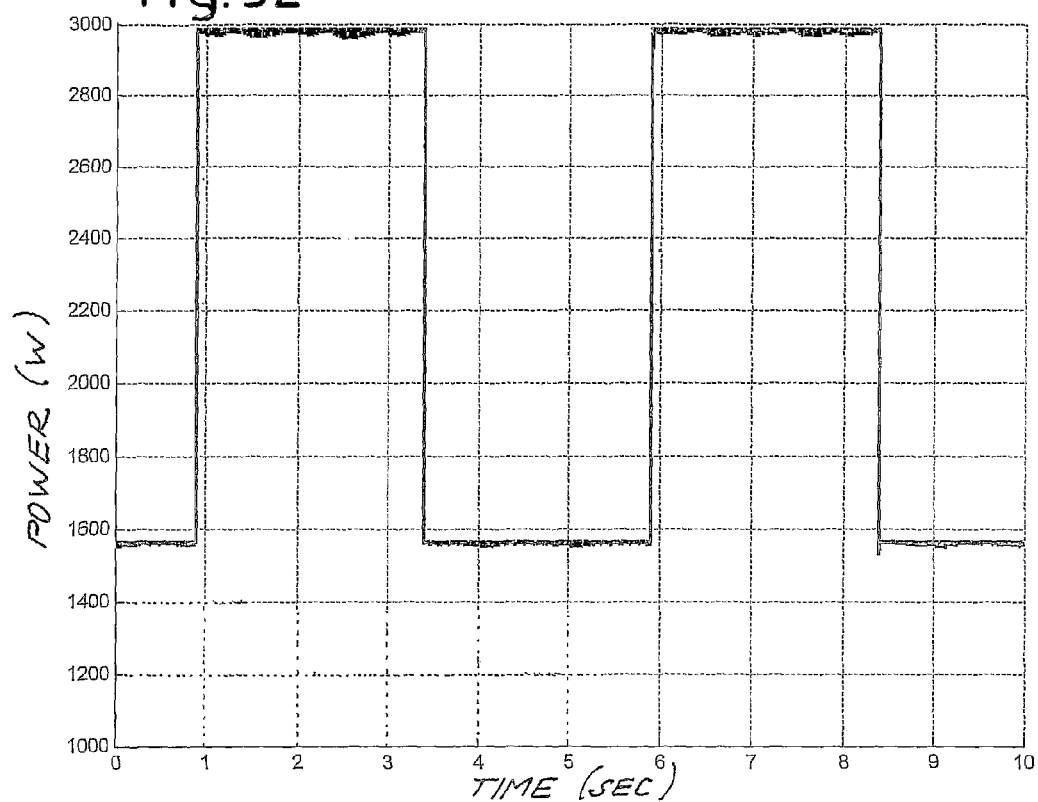
Figure 33:
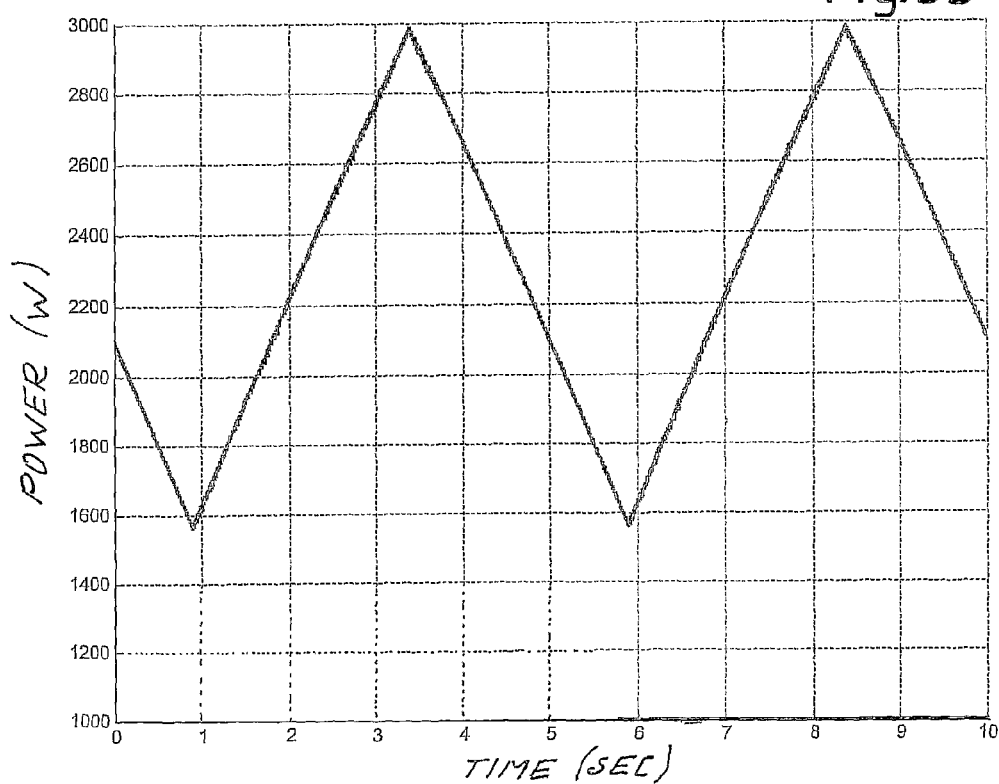

The voltage-mode control hence guarantees at the same time better energy performance and greater reliability and robustness of the control. Said performance is maintained also in conditions of greater rapidity of variation of insolation, as highlighted by the waveforms appearing in FIGS. 32 and 33, corresponding to perturbations of the insolation of the square-wave and triangular-wave type.

It is understood that the drawings simply show practical embodiments of a device according to the invention and that the invention may vary in its embodiments and arrangements, without departing from the scope of the idea underlying the invention, as defined in the ensuing claims. Any reference numbers appearing in the claims in no way limit the sphere of protection and merely have the purpose of facilitating reading thereof in the light of the foregoing description and the attached plate of drawings.

The invention claimed is:

1. A system for generating electric power, comprising:
an electric-power source, having a preferential point of operation, correlated to at least one variable parameter that can vary as a function of at least one non-controllable event;
a double-stage inverter having an output coupled to an electrical power network and further comprising as a first stage a DC/DC boost converter, controlled via a control parameter, and as a second stage a DC/AC inverter;
a block for identifying the preferential point of operation, said block supplying a reference signal according to the conditions of operation of said electric-power source and to the preferential point of operation of said electric-power source;
a corrector block comprising a compensator effective to set the control parameter for the boost converter as a function of an error signal generated by a comparison of said reference signal and a signal of actual operation of said electric-power source, wherein said electric-power source is maintained in the proximity of the preferential point of operation; and
the boost converter effective in response to the control parameter to suppress or reduce an effect on said reference signal and said variable parameter of at least one disturbance at a pre-determined frequency coming from the electrical network to which the output of said inverter is connected.

2. The system of claim 1, wherein said signal of actual operation of said electric-power source further comprises said variable parameter.

3. The system of claim 2, wherein said electric-power source comprises at least one field of photovoltaic panels and wherein said preferential point of operation is the point of delivery of the maximum power, the variable parameter being constituted by the voltage across the field of photovoltaic panels, said voltage across the field of photovoltaic panels varying according to the solar power incident on said field of photovoltaic panels.

4. The system of claim 3, wherein said block for identifying the preferential point of operation is a block that executes a maximum power-point tracking (MPPT) algorithm.

5. The system of claim 4, wherein said MPPT algorithm comprises a perturb-and-observe algorithm.

6. The system of claim 5, wherein said reference signal supplied by the block for identifying the preferential point of operation is a reference voltage across the field of photovoltaic panels, and wherein said corrector block determines the value of the parameter for controlling the boost converter as a function of the difference between said reference voltage and of the actual voltage across the field of photovoltaic panels.

7. The system of claim 6, wherein said parameter for controlling the boost converter is the duty cycle of said boost converter.

8. The system of claim 7, wherein said disturbance is constituted by an oscillation of the bulk voltage at output from said boost converter, at the second harmonic of the network voltage.

9. The system of claim 8, wherein said corrector block comprises a regulator with a pass band higher than the second harmonic of the network voltage.

10. A method for controlling the operation of an electric-power source having a preferential point of operation correlated to at least one parameter that can vary as a function of at least one non-controllable event, comprising the steps of:
extracting DC power at an output voltage from said source;
boosting the output voltage from the output value of said source to a higher value DC output voltage by means of a DC/DC boost converter;
converting said DC output voltage into an AC output voltage by means of an inverter;
introducing the AC output voltage from the inverter into an AC-voltage electrical network, to which said inverter is connected;
generating a reference signal, which is a function of the conditions of operation of the electric-power source and of the preferential point of operation of said source;
comparing said reference signal with a signal representative of actual operation of the electric-power source and generating an error signal based on the comparison; and
as a function of said error signal, regulating a parameter for controlling said boost converter via a corrector block sized to suppress or reduce the effect on said signal representative of actual operation and on said reference signal of at least one disturbance at a pre-determined frequency, coming from the electrical network to which said inverter is connected.

11. The method of claim 10, in which said electric-power source comprises at least one field of photovoltaic panels, said method comprising the step of identifying a point of delivery of the maximum power as a function of the conditions of solar irradiation on said field of photovoltaic panels, said signal representative of actual operation being the voltage across the field of photovoltaic panels.

12. The method of claim 11, further comprising the steps of:
determining a reference voltage across the field of photovoltaic panels, corresponding to the preferential point of operation; and
detecting the actual voltage across the field of photovoltaic panels and generating said error signal.

13. The method of claim 12, in which said parameter for controlling the boost converter is the duty cycle.

14. The method of claim 13, in which said point of delivery of the maximum power is identified via a perturb and-observe algorithm.

* * * * *